US012100005B2

(12) United States Patent
Ogatsu et al.

(10) Patent No.: US 12,100,005 B2
(45) Date of Patent: Sep. 24, 2024

(54) PAYMENT SYSTEM, PAYMENT METHOD, AND COMPUTER PROGRAM

(71) Applicant: NEC Corporation, Tokyo (JP)

(72) Inventors: Toshinobu Ogatsu, Tokyo (JP); Ryoma Oami, Tokyo (JP); Hidekazu Tanaka, Tokyo (JP); Yuriko Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 125 days.

(21) Appl. No.: 17/640,602

(22) PCT Filed: Mar. 8, 2021

(86) PCT No.: PCT/JP2021/008957
§ 371 (c)(1),
(2) Date: Mar. 4, 2022

(87) PCT Pub. No.: WO2022/190164
PCT Pub. Date: Sep. 15, 2022

(65) Prior Publication Data
US 2023/0196364 A1 Jun. 22, 2023

(51) Int. Cl.
*G06Q 40/00* (2023.01)
*G06Q 20/40* (2012.01)
*G06Q 20/42* (2012.01)

(52) U.S. Cl.
CPC ....... *G06Q 20/40145* (2013.01); *G06Q 20/42* (2013.01)

(58) Field of Classification Search
CPC ............ G06Q 20/40145; G06Q 20/42; G06Q 20/208; G07G 1/0036
See application file for complete search history.

(56) References Cited

U.S. PATENT DOCUMENTS 11,348,083 B1 * 5/2022 Grassadonia ........ G06Q 20/204
2009/0157481 A1 * 6/2009 Jung ...................... A61B 5/378
709/205
(Continued)

FOREIGN PATENT DOCUMENTS

JP   2005-242677 A   9/2005
JP   2009-104426 A   5/2009
(Continued)

OTHER PUBLICATIONS

Ahmed et al: "Combining iris and periocular biometric for matching visible spectrum eye images", Pattern Recognition Letters, vol. 91, pp. 11-16, May 1, 2017 (Year: 2017).*

(Continued)

*Primary Examiner* — Edward J Baird

(57) ABSTRACT

A payment system includes: a merchandise reading unit that reads merchandise; a merchandise information acquisition unit that obtains a merchandise information about the read merchandise; a confirmation information output unit that outputs a confirmation information for confirming with a customer an intention of payment of the merchandise; a receiving unit that receives an input from the customer for the confirmation information; a face acquisition unit that obtains a face image of the customer; an iris acquisition unit that obtains an iris image of the customer; and a payment processing unit that performs a payment process for the merchandise on the basis of the input from the customer and on the basis of at least one of the face image and the iris image. According to such a payment system, the payment process for the merchandise can be properly performed.

7 Claims, 35 Drawing Sheets

(56) References Cited

U.S. PATENT DOCUMENTS

| | | | |
|---|---|---|---|
| 2010/0079243 A1 | 4/2010 | Hamada | |
| 2013/0147603 A1* | 6/2013 | Malhas | G06V 40/18 340/5.83 |
| 2014/0002352 A1 | 1/2014 | Jacob et al. | |
| 2014/0363058 A1* | 12/2014 | Emmett | G06V 40/193 382/117 |
| 2015/0278590 A1* | 10/2015 | Gunjan | G06V 40/70 382/118 |
| 2015/0358594 A1 | 12/2015 | Marshall et al. | |
| 2017/0011265 A1* | 1/2017 | Shaw | G06V 20/52 |
| 2017/0124392 A1* | 5/2017 | Gu | H04N 23/56 |
| 2017/0337542 A1 | 11/2017 | Kim et al. | |
| 2017/0346817 A1* | 11/2017 | Gordon | G06V 40/10 |
| 2018/0012006 A1 | 1/2018 | Suh et al. | |
| 2020/0057847 A1 | 2/2020 | Oh et al. | |
| 2020/0134632 A1 | 4/2020 | Cui | |
| 2021/0304210 A1* | 9/2021 | Goda | G06Q 20/02 |
| 2022/0343635 A1* | 10/2022 | Shinzaki | G07G 1/0063 |

FOREIGN PATENT DOCUMENTS

| | | | | |
|---|---|---|---|---|
| JP | 2009-237643 A | 10/2009 | | |
| JP | 2018-010625 A | 1/2018 | | |
| JP | 2020-166642 A | 10/2020 | | |
| WO | WO-2012141700 A1 * | 10/2012 | ......... | G06Q 30/0261 |
| WO | 2019/150807 A1 | 8/2019 | | |

OTHER PUBLICATIONS

International Search Report for PCT Application No., PCT/JP2021/008957, mailed on Jun. 8, 2021.

Ryoma Oami, High-precision biometric authentication technology that allows authentication of the face and iris with one action, [online], NEC Corporation, May 14, 2020, 1-3, [retrieval date Jun. 1, 2021], <URL:https://jpn.nec.com/rd/technologies/202004/index.html>, 2nd page line14-18, photograph "Identify authentication OK scene with face and iris", 2nd page line14-18, photograph.

Daisuke Yagi et. al., "Research of Personal Authentication System using Gaze Data Mining", The 30th Annual Conference of the Japanese Society for Artificial Intelligence, 2016, Jun. 9, 2016, the 30th/Paper No. 1K2-3, pp. 1-4, 3rd page Chapter 4—4th page Chapter 5, Table 5.

Extended European Search Report for EP Application No. 21930023.3, dated on Apr. 8, 2024.

1 JP Office Action for JP Application No. 2023-504686, mailed on May 21, 2024 with English Translation.

* cited by examiner

FIG. 13A WHEN TILT POSITION OF CAMERA IS IN THE MIDDLE
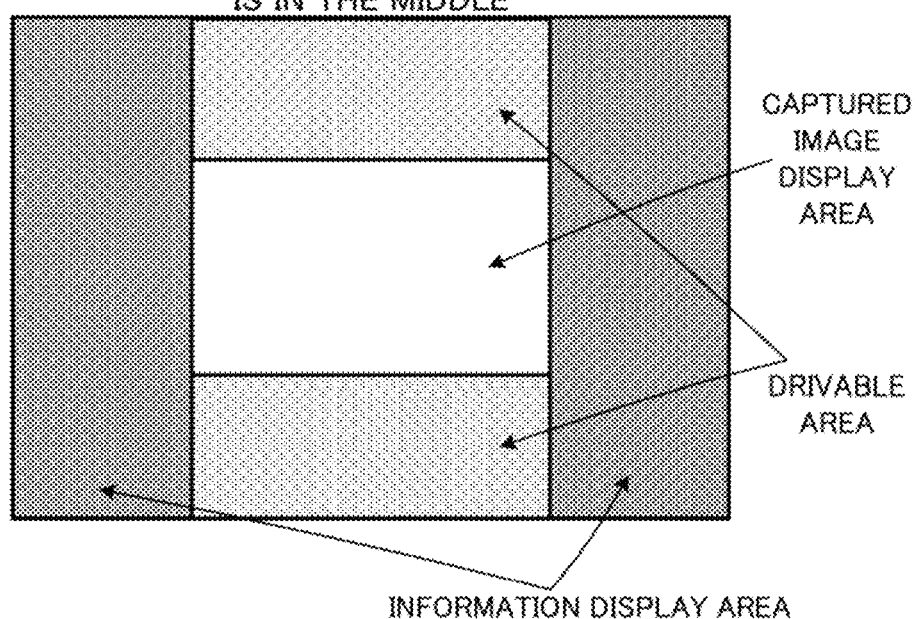
FIG. 13B WHEN TILT POSITION OF CAMERA IS AT UPPER LIMIT
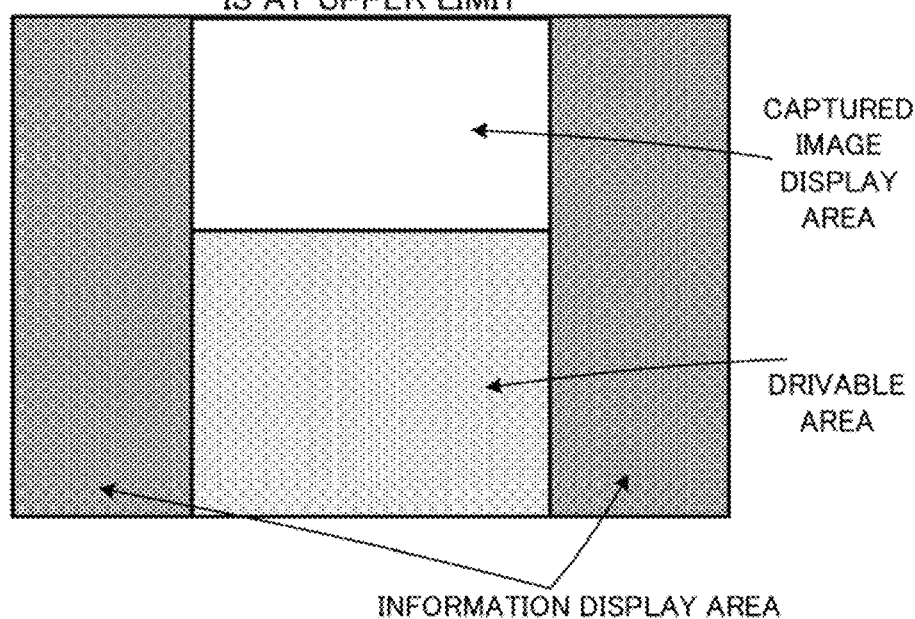

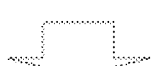
FIG. 31

FIG. 32A

SCAN BARCODE OF MERCHADISE   TOTAL  ONE ITEM  JPY150

REPURCHASE

| MERCHANDISE NAME | QUANTITY | PRICE | TAX | |
|---|---|---|---|---|
| | | | Incl. | |
| AQUA Natural Water | 1 | 150 | Incl. | CANCEL |

FIG. 32B

SCAN BARCODE OF MERCHADISE   TOTAL (BEFORE CANCEL) ONE ITEM  JPY150
TOTAL (AFTER CANCEL) TWO ITEMS  JPY350

| MERCHANDISE NAME | QUANTITY | PRICE | TAX | |
|---|---|---|---|---|
| AQUA Natural Water | 1 | 150 | Incl. | CANCEL |

| SCAN BARCODE OF MERCHADISE | | TOTAL TWO ITEMS JPY350 | | |
|---|---|---|---|---|
| MERCHANDISE NAME | | QUANTITY | PRICE | TAX |
| Almond Chocolate | | 1 | 200 | Incl. |
| AQUA Natural Water | | 1 | 150 | Incl. |

CHANGE AMOUNT OF MONEY

FIG. 34B

| SCAN BARCODE OF MERCHADISE | | TOTAL TWO ITEMS JPY350 | | |
|---|---|---|---|---|
| MERCHANDISE NAME | | QUANTITY | PRICE | TAX |
| Almond Chocolate | | 1 | 200 | Incl. |
| AQUA Natural Water | | 1 | 150 | Incl. |

CALLING THE STAFF.
PLEASE WAIT A WHILE.

FIG. 35A

| MERCHANDISE NAME | AGE CONFIRMATION | QUANTITY | PRICE | TAX |
|---|---|---|---|---|
| Almond Chocolate | NO NEED | 1 | 200 | Incl. |
| AQUA Natural Water | NO NEED | 1 | 150 | Incl. |
| SAKE | NOT YET CONFIRMED | 1 | 200 | Incl. |

THERE IS AN ARTICLE OF MERCHANDISE THAT REQUIRES AGE CONFIRMATION. PLEASE HOLD YOUR ID OVER CAMERA.

FIG. 35B

| MERCHANDISE NAME | AGE CONFIRMATION | QUANTITY | PRICE | TAX |
|---|---|---|---|---|
| Almond Chocolate | NO NEED | 1 | 200 | Incl. |
| AQUA Natural Water | NO NEED | 1 | 150 | Incl. |
| SAKE | CONFIRMED | 1 | 200 | Incl. |

AGE CONFIRMATION IS SUCCESSFULLY COMPLETED.

PAYMENT SYSTEM, PAYMENT METHOD, AND COMPUTER PROGRAM

This application is a National Stage Entry of PCT/JP2021/008957 filed on Mar. 8, 2021, the contents of all of which are incorporated herein by reference, in their entirety.

TECHNICAL FIELD

This disclosure relates to a payment system, a payment method, and a computer program that perform a process of payment or settlement for merchandise.

BACKGROUND ART

An authentication apparatus that performs an authentication process using a plurality of pieces of biometric information (i.e., a complex type biometric authentication or a multi-modal biometric authentication) is known as an exemplary authentication apparatus that is configured to authenticate a target person, such as a person. For example, Patent Literature 1 discloses a technique/technology in which outputs from a plurality of biometric authentication devices are combined to perform the authentication process. Patent Literature 2 discloses a technique/technology in which degrees of authentication of two authentication methods are weighted and added, and a resulting degree of authentication is used to perform identity verification.

CITATION LIST

Patent Literature

Patent Literature 1: JP2018-10625A
Patent Literature 2: JP2009-237643A

SUMMARY

Technical Problem

This disclosure has been made, for example, in view of the aforementioned cited literatures, and an example object thereof is to provide a payment system, a payment method, and a computer program that are configured to appropriately perform a payment process for merchandise.

Solution to Problem

A payment system according to an example aspect of this disclosure includes: a merchandise reading unit that reads merchandise; a merchandise information acquisition unit that obtains a merchandise information about the read merchandise; a confirmation information output unit that outputs a confirmation information for confirming with a customer an intention of payment of the merchandise; a receiving unit that receives an input from the customer for the confirmation information; a face acquisition unit that obtains a face image of the customer; an iris acquisition unit that obtains an iris image of the customer; and a payment processing unit that performs a payment process for the merchandise on the basis of the input from the customer and on the basis of at least one of the face image and the iris image.

A payment method according to an example aspect of this disclosure includes: reading merchandise; obtaining a merchandise information about the read merchandise; outputting a confirmation information for confirming with a customer an intention of payment of the merchandise; receiving an input from the customer for the confirmation information; obtaining a face image of the customer; obtaining an iris image of the customer; and performing a payment process for the merchandise on the basis of the input from the customer and on the basis of at least one of the face image and the iris image.

A computer program according to an example aspect of this disclosure allows a computer to execute: reading merchandise; obtaining a merchandise information about the read merchandise; outputting a confirmation information for confirming with a customer an intention of payment of the merchandise; receiving an input from the customer for the confirmation information; obtaining a face image of the customer; obtaining an iris image of the customer; and performing a payment process for the merchandise on the basis of the input from the customer and on the basis of at least one of the face image and the iris image.

BRIEF DESCRIPTION OF DRAWINGS

FIG. 13 is a conceptual diagram illustrating a display example when reading merchandise.

FIG. 20 is a conceptual diagram illustrating a display example of a frame that gradually converges to the gaze area.

FIG. 22 is a conceptual diagram illustrating a display example in which the color of the gaze area is gradually changed toward the outside of a screen.

FIG. 31 is a conceptual diagram illustrating a display example of a cancel button.

FIG. 32 is a conceptual diagram illustrating a display example after a cancel.

FIG. 33 is a conceptual diagram illustrating a display example of a number change button.

FIG. 34 is a conceptual diagram illustrating a display example of an amount change button.

FIG. 35 is a conceptual diagram illustrating a display example when there is an article of merchandise that requires age confirmation.

DESCRIPTION OF EXAMPLE EMBODIMENTS

Hereinafter, a payment system, a payment method, and a computer program according to example embodiments will be described with reference to the drawings.

First Example Embodiment

A payment system according to a first example embodiment will be described with reference to FIG. 1 to FIG. 3.
(Hardware Configuration)

Firstly, a hardware configuration of a payment system 10 according to the first example embodiment will be described with reference to FIG. 1. FIG. 1 is a block diagram illustrating the hardware configuration of the payment system according to the first example embodiment.

Figure 1:
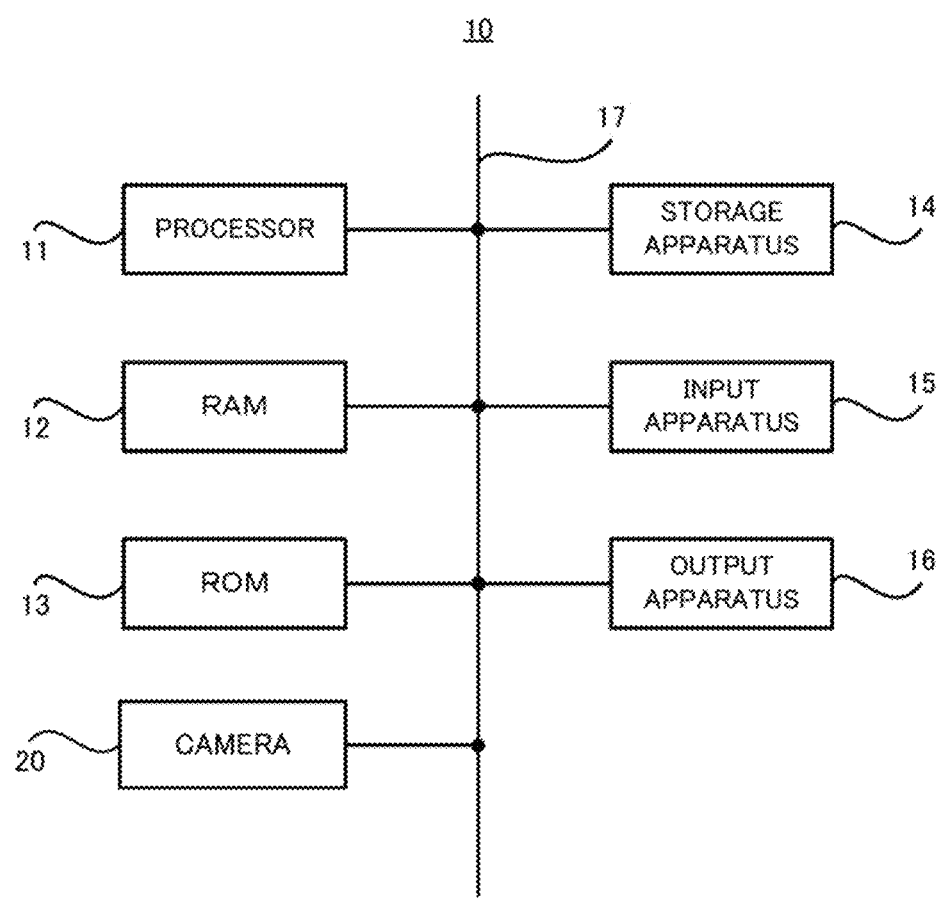
FIG. 1 is a block diagram illustrating a hardware configuration of a payment system according to a first example embodiment.

As illustrated in FIG. 1, the payment system 10 according to the first example embodiment includes a processor 11, a RAM (Random Access Memory) 12, a ROM (Read Only Memory) 13, and a storage apparatus 14. The payment system 10 may further include an input apparatus 15, an output apparatus 16, and a camera 20. The processor 11, the RAM 12, the ROM 13, the storage apparatus 14, the input apparatus 15, the output apparatus 16, and the camera 20 are connected through a data bus 17.

The processor 11 reads a computer program. For example, the processor 11 is configured to read a computer program stored in at least one of the RAM 12, the ROM 13 and the storage apparatus 14. Alternatively, the processor 11 may read a computer program stored in a computer-readable recording medium, by using a not-illustrated recording medium reading apparatus. The processor 11 may obtain (i.e., read) a computer program from a not-illustrated apparatus located outside the payment system 10, through a network interface. The processor 11 controls the RAM 12, the storage apparatus 14, the input apparatus 15, and the output apparatus 16 by executing the read computer program. Especially in the first example embodiment, when the processor 11 executes the read computer program, a function block for performing a process related to the payment of merchandise is implemented in the processor 11. As the processor 11, one of a CPU (Central Processing Unit), a GPU (Graphics Processing Unit), a FPGA (field-programmable gate array), a DSP (Demand-Side Platform), and an ASIC (Application Specific Integrated Circuit) may be used, or a plurality of them may be used in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the payment system 10. The storage apparatus 14 may operate as a temporary storage apparatus of the processor 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the payment system 10. The input apparatus 15 may include, for example, at least one of a keyboard, a mouse, and a touch panel.

The output apparatus 16 is an apparatus that outputs information about the payment system 10 to the outside. For example, the output apparatus 16 may be a display apparatus (e.g., a display) that is configured to display the information about the payment system 10.

The camera 20 is a camera that is configured to image an iris and a face of a living body. The camera 20 may be configured, for example, as a near-infrared camera. The camera 20 may be placed at a position such that a face periphery of the living body is included in its imaging range. The camera 20 may be a camera for capturing a still image or a camera for capturing a moving image. In addition, as will be described later, there may be not only one but two cameras. Then, one may be a visible light camera and the other may be a near-infrared camera; namely, the cameras may have different wavelength bands of the light to image. The visible light camera may be able to image a face, and the near-infrared camera may be able to image the iris. Alternatively, both may be near-infrared cameras, or both may be visible light cameras.

(Functional Configuration)

Next, a functional configuration of the payment system 10 according to the first example embodiment will be described with reference to FIG. 2. FIG. 2 is a block diagram illustrating the functional configuration of the payment system according to the first example embodiment.

Figure 2:
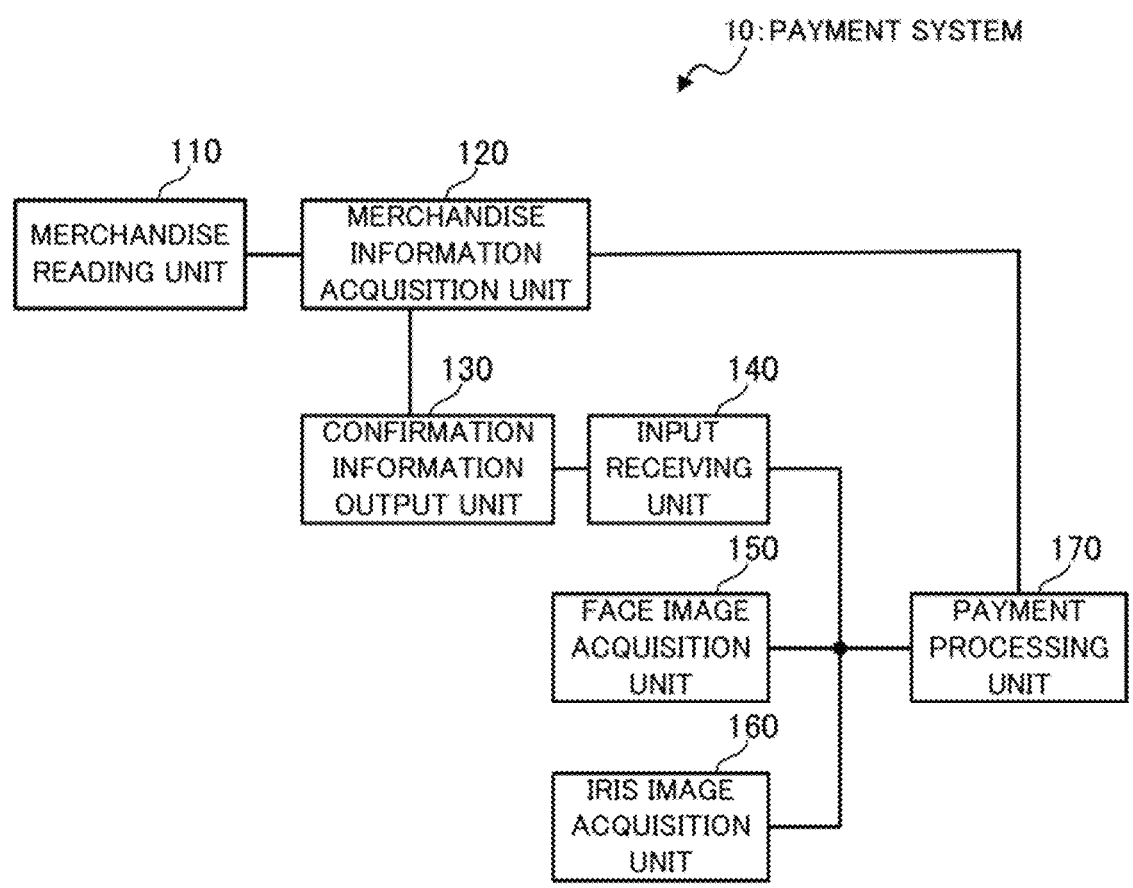
FIG. 2 is a block diagram illustrating a functional configuration of the payment system according to the first example embodiment.

As illustrated in FIG. 2, the payment system 10 according to the first example embodiment includes a merchandise reading unit 110, a merchandise information acquisition unit 120, a confirmation information output unit 130, an input receiving unit 140, a face image acquisition unit 150, an iris image acquisition unit 160, and a payment processing unit 170, as processing blocks for realizing its functions. Each of the merchandise reading unit 110, the merchandise information acquisition unit 120, the confirmation information output unit 130, the input receiving unit 140, the face image acquisition unit 150, the iris image acquisition unit 160, and the payment processing unit 170 may be implemented, for example, in the processor 11 described above. Furthermore, the merchandise reading unit 110, the face image acquisition unit 150, and the iris image acquisition unit 160 may include the above-described camera 20. The input receiving unit 140 may include the input apparatus 15 and the camera 20 described above. The confirmation information output unit 130 may include the output apparatus 16 described above (more specifically, a display apparatus such as a display).

The merchandise reading unit 110 is configured to read merchandise. For example, the merchandise reading unit 110 may be configured to read merchandise by obtaining an image of the merchandise by using the camera 20. Alternatively, the merchandise reading unit 110 may be configured to read merchandise by using various readers or scanners (e.g., a barcode scanner or the like). The merchandise reading unit 110 may be configured to read the merchandise that is placed in a predetermined position, or may be configured to read the merchandise that is held by a customer.

The merchandise information acquisition unit 120 is configured to obtain a merchandise information about the merchandise read by the merchandise reading unit 110. Examples of the merchandise information include, for example, a barcode information, a price, a merchandise name, quantity of stock, and the like. The merchandise information acquisition unit 120 may read and obtain the merchandise information from a database or the like in which the merchandise information is stored in advance.

The confirmation information output unit 130 is configured to output a confirmation information for confirming a customer's intention to pay the merchandise read by the merchandise reading unit 110 (i.e., whether or not the customer intends to purchase the merchandise). The confirmation information output unit 130 may be configured to output an image information, for example, by using a display apparatus or the like. The confirmation information output unit 130 may be configured to output an audio information for example, by using a speaker or the like. A specific example of the confirmation information will be described in detail in other example embodiments described later.

The input receiving unit 140 is configured to receive an input from the customer for the confirmation information (in other words, information about the intention of payment). The input receiving unit 140 may receive the input from the customer, for example, by using a camera. The input receiving unit 140 may receive the input from the customer, for example, by using the input apparatus 15. A specific method of receiving the input from the customer will be described in detail in other example embodiments described later.

The face image acquisition unit 150 is configured to obtain a face image of the customer. The face image is an image that contains the customer's face, and is typically an image that is captured to include the entire face. Furthermore, the face image may be an image that contains a part other than the customer's face. The face image acquisition unit 150 may obtain an image captured by the camera 20 as the face image.

The iris image acquisition unit 160 is configured to be obtain an iris image of the customer. The iris image is an image that includes the customer's iris and is typically a high definition image to the extent that an iris pattern can be seen. In addition, the iris image may be an image that contains a part other than the customer's iris. The iris image acquisition unit 160 may obtain an image captured by the camera 20 as the iris image. In this case, the camera 20 may include a plurality of cameras that capture each of the face image and the iris image described above. A specific example of such a camera 20 will be described in detail in other example embodiments described later.

The payment processing unit 170 is configured to perform a payment process for the merchandise that is read by the merchandise reading unit 110. The payment processing unit 170 performs the payment process on the basis of the input from the customer that is received by the input receiving unit 140, and on the basis of at least one of the face image obtained by the face image acquisition unit 150 and the iris image obtained by the iris image acquisition unit 160. The payment processing unit 170 may determine whether or not to perform the payment process, for example, on the basis of the input from the customer that is received by the input receiving unit 140. Furthermore, the payment processing unit 170 may perform an authentication process (i.e., identity verification) on the basis of at least one of the face image obtained by the face image acquisition unit 150 and the iris image obtained by the iris image acquisition unit 160. Incidentally, in a database of a payment service, a biometric information about the customer (e.g., information about the face image, the iris image, or the like used in the authentication process) and information about a financial institution may be stored in association with each other. In this instance, in the payment process after the authentication process, a payment amount is withdrawn from an account of a financial institution of the customer identified by the authentication process. In addition, the biometric information about the customer may be stored in association with information about a credit card, information about an account of an electronic payment service (in this case, withdrawal from the balance that is charged), a telephone number of a mobile phone, etc. (in this case, charge summed with a usage fee of the mobile phone) in place of the information about the financial institution described above. In addition, when a plurality of the payment methods are related to the biometric information about the customer, a screen for selecting a payment method by gaze direction estimation may be displayed to allow a user to select the payment method, as described in another example embodiment described later.

(Flow of Operation)

Next, a flow of the operation of the payment system 10 according to the first example embodiment will be described with reference to FIG. 3. FIG. 3 is a flowchart illustrating a flow of the operation of the payment system according to the first example embodiment.

Figure 3:
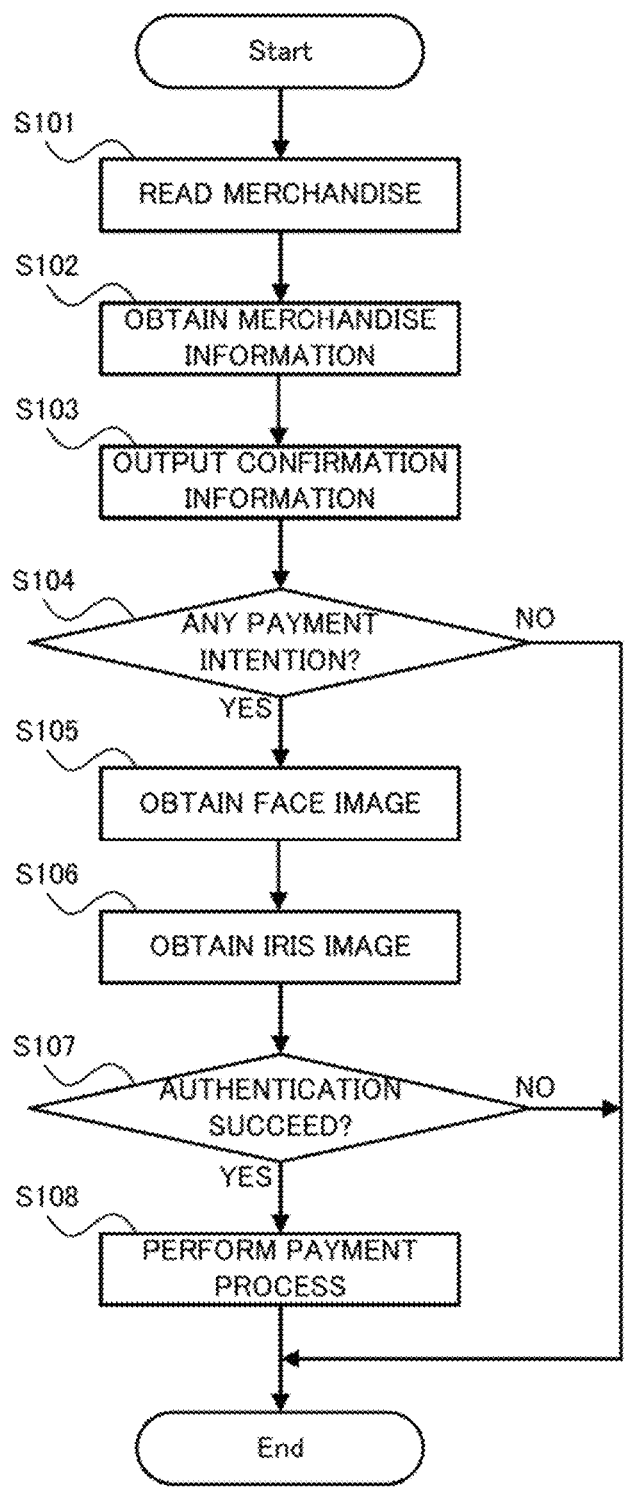
FIG. 3 is a flowchart illustrating a flow of the operation of the payment system according to the first example embodiment.

As illustrated in FIG. 3, in operation of the payment system 10 according to the first example embodiment, the merchandise reading unit 110 firstly reads merchandise (step S101). Then, the merchandise information acquisition unit 120 obtains the merchandise information about the merchandise read by the merchandise reading unit 110 (step S102). The above-described step S101 and step S102 may be performed collectively for a plurality of articles of merchandise.

Subsequently, the confirmation information output unit 130 outputs the confirmation information for confirming the intention of payment (step S103). Then, the input receiving unit 140 determines whether or not the customer has an intention of payment using biometric authentication on the basis of the input from the customer (step S104). The intention of payment determined here may be to confirm whether or not the read merchandise is correct (e.g., whether there is no merchandise that is out of stock, or whether unnecessary merchandise is read, etc.). Incidentally, the input receiving unit 140 may determine that the customer has an intention of payment when there is an input from the customer, and may determine that the customer has no intention of payment when there is no input from the customer.

When it is determined that the customer does not have an intention of payment using the biometric authentication (the step S104: NO), a series of steps ends. That is, the payment processing unit 170 determines that the customer has no intention to purchase the merchandise by using the biometric authentication, and ends the operation without performing the payment process. In this case, the customer stops the payment, or makes a payment by means other than the biometric authentication. On the other hand, when it is determined that the customer has an intention of payment using the biometric authentication (the step S104: YES), the face image acquisition unit 150 obtains the face image of the customer (step S105). Furthermore, the iris image acquisition unit 160 obtains the iris image of the customer (step S106). Then, the payment processing unit 170 performs the authentication process for the customer on the basis of at least one of the face image and the iris image obtained (step S107). A detailed description of the authentication process using the face image and the iris image will be omitted here because the existing technique/technology can be appropriately adopted thereto. Furthermore, the step S105 and the step S106 may be performed at the same time.

When the authentication process for the customer does not succeed (the step S107: NO), a series of steps ends. That is, the payment processing unit 170 determines not to authenticate the customer (e.g., determines that the customer is spoofing) and ends the operation without performing the payment process. Alternatively, it may confirm with the customer whether or not to perform the payment using the biometric authentication again. On the other hand, when the authentication process for the customer succeeds (the step S107: YES), the payment processing unit 170 performs the payment process for the merchandise by using the merchandise information (step S108).

In the above-described example, the process of confirming the payment intention (i.e., the step S104) is performed after the merchandise is read (i.e., after the step S101), but it may be performed before the merchandise is read. Also, the process of confirming the payment intention may be performed after the authentication process (i.e., after the S107). In addition, the process of confirming the payment intention may be performed in several stages. For example, the process of confirming the payment intention may be performed before the authentication process as described above, and then, the process of to confirming the payment intention may be performed again after the authentication process. When confirming the payment intention before and after the authentication process, the content may differ from each other in the two cases. For example, confirming the payment intention before the authentication process is to confirm whether or not the read merchandise is correct as described above, whereas confirming the payment intention after the authentication process may be to confirm with the customer himself or herself whether or not an authentication result of the biometric authentication is correct. In such cases, the payment process may be performed automatically at the same time as the identity verification, or the customer may be allowed to select the payment method after the identity verification. For example, the customer may be allowed to select whether to pay by a payment method associated with the biometric information or pay by other methods.

Technical Effects

Next, technical effects obtained by the payment system 10 according to the first example embodiment will be described.

As described in FIG. 1 to FIG. 3, in the payment system 10 according to the first example embodiment, when the customer's intention of payment is confirmed by the biometric authentication and the authentication process for the customer succeeds, the payment process is performed on the merchandise. In this way, it is possible to avoid the implementation of an incorrect payment process. For example, it is possible to prevent that the payment process is performed even though the customer has no intention of payment, or that the payment process is performed by someone else who pretends to be the customer.

Second Example Embodiment

The payment system 10 according to a second example embodiment will be described with reference to FIG. 4 to FIG. 11. The second example embodiment will be described in detail with respect to the camera 20 used in the payment system 10, and the configuration of the entire system, the flow of operation, and the like may be the same as those of the first example embodiment (see FIG. 1 to FIG. 3). Therefore, in the following, a description of the part that overlaps with the first example embodiment already described will be omitted accordingly.

(Camera Configuration)

Figure 4:
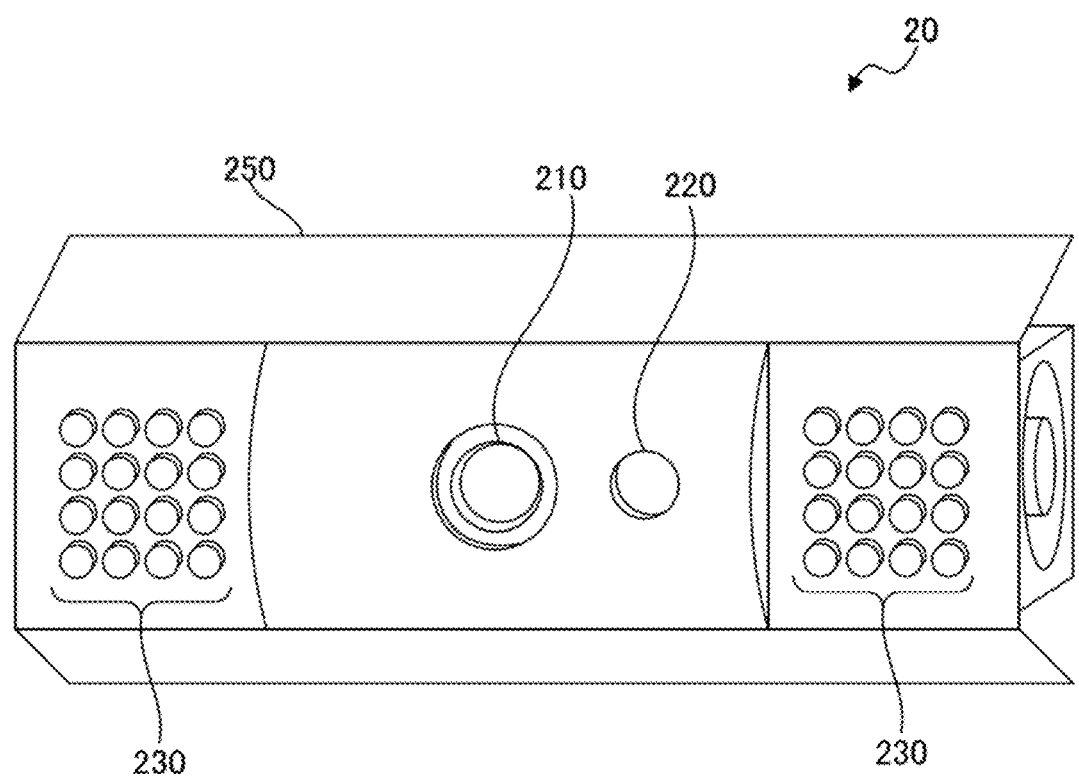
FIG. 4 is version 1 of a schematic diagram illustrating a configuration of a camera according to a second example embodiment.
Figure 5:
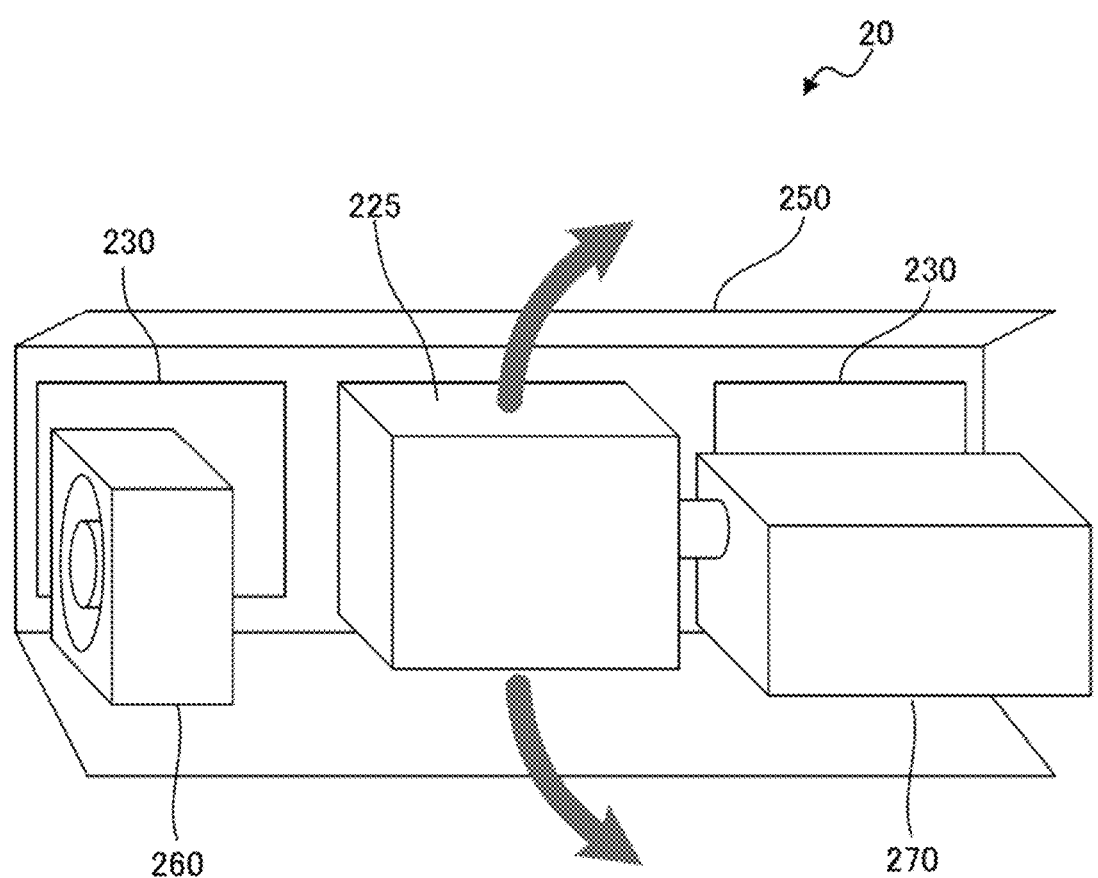
FIG. 5 is version 2 of the schematic diagram illustrating the configuration of the camera according to the second example embodiment.
Figure 6:
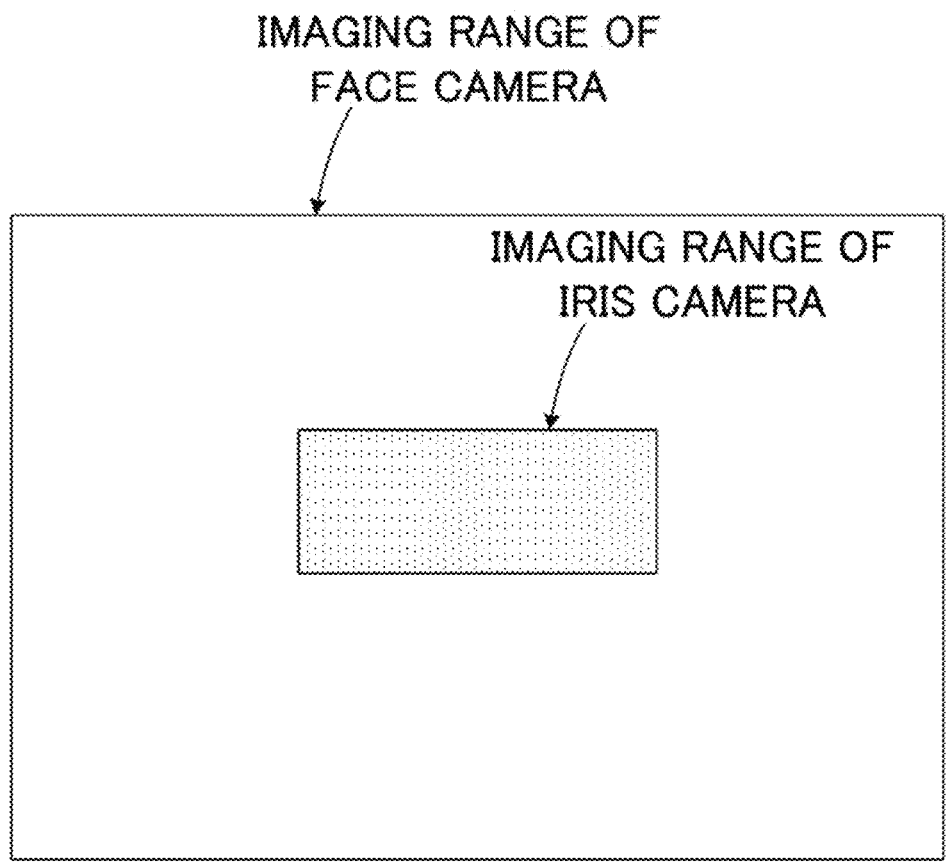
FIG. 6 is a plan view illustrating a relation between an imaging range of a face camera and an imaging range of an iris camera.
Figure 7:
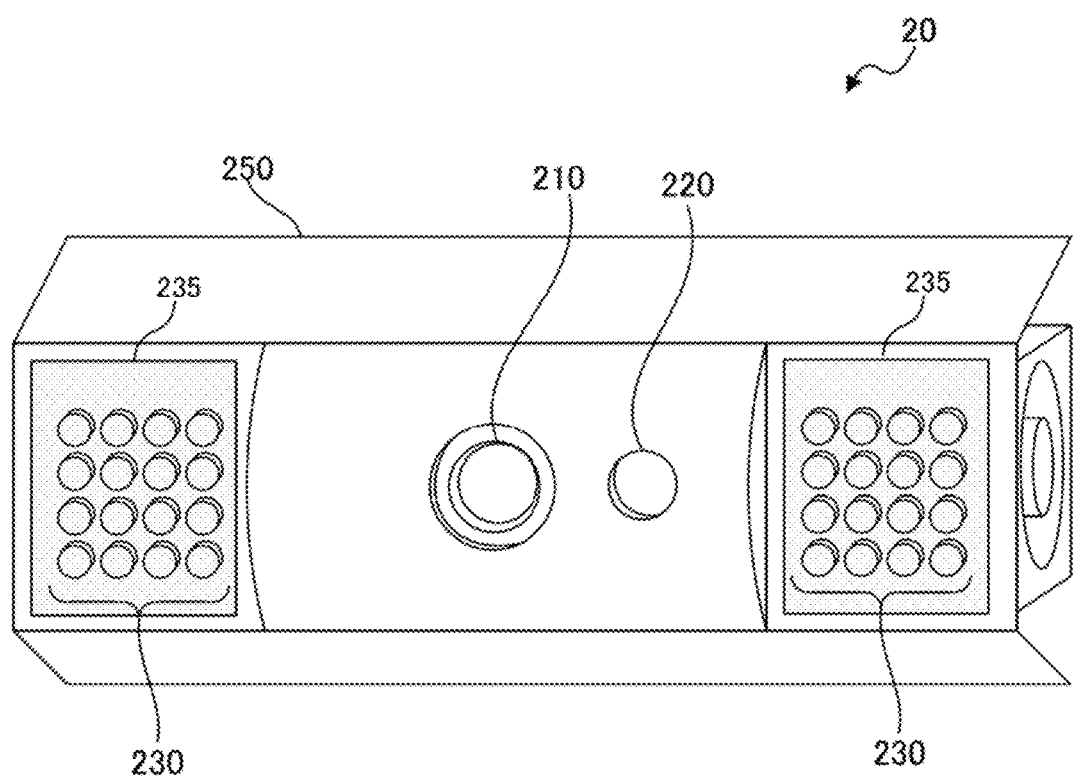
FIG. 7 is a schematic diagram illustrating an example of a visible light filter provided in an illumination unit.
Figure 8:
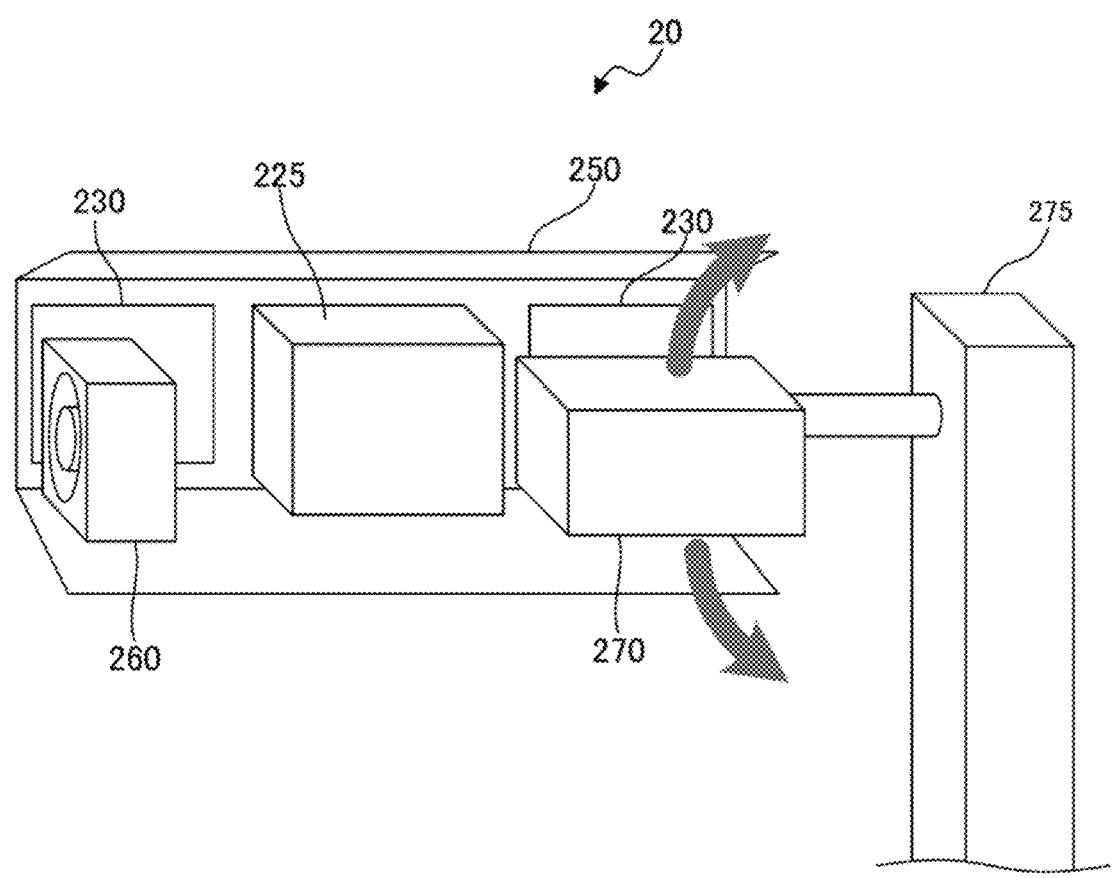
FIG. 8 is a schematic diagram illustrating a configuration in which a motor is fixed to a fixed part outside an apparatus.
Figure 9:
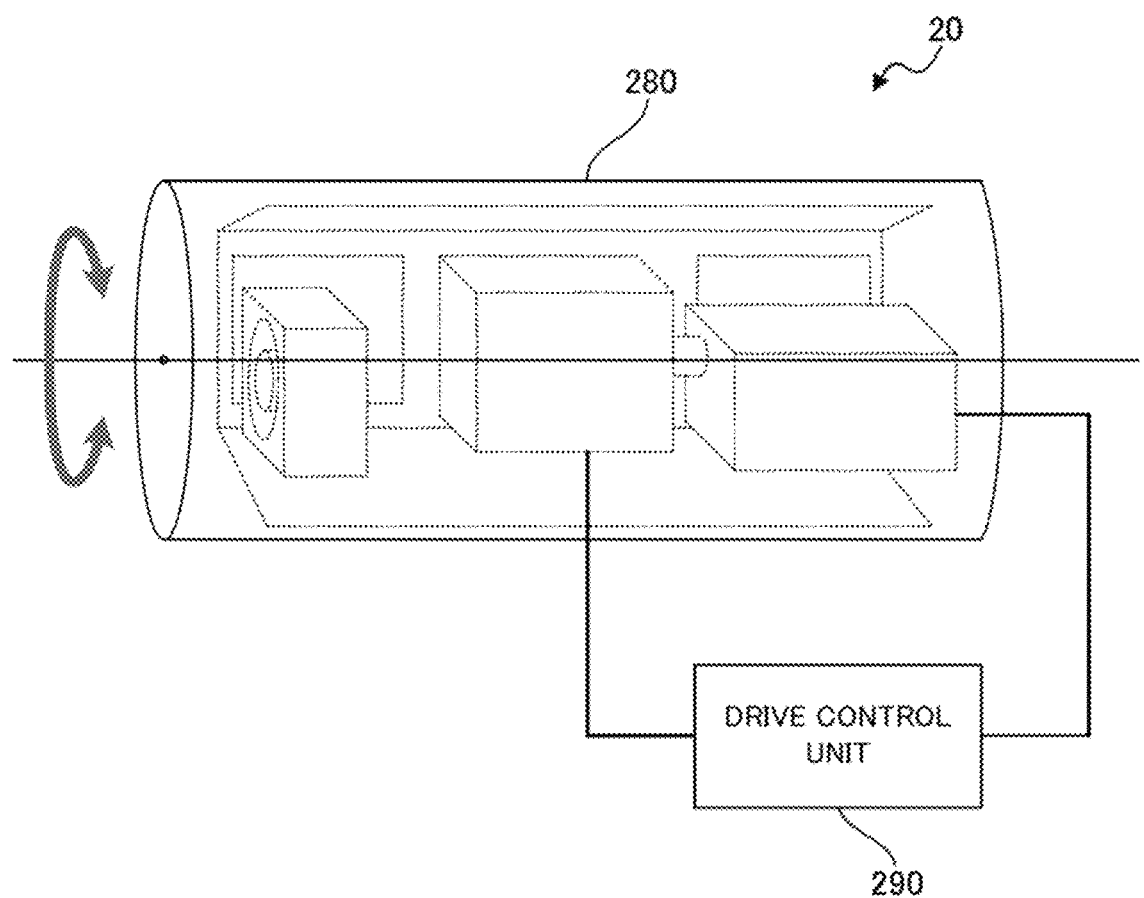
FIG. 9 is a conceptual diagram illustrating a drive direction of the camera according to the second example embodiment.

A configuration of the camera 20 used in the payment system according to the second example embodiment will be described with reference to FIG. 4 to FIG. 9. FIG. 4 is version 1 of a schematic diagram illustrating the configuration of the camera according to the second example embodiment. FIG. 5 is version 2 of the schematic diagram illustrating the configuration of the camera according to the second example embodiment. FIG. 6 is a plan view illustrating a relation between an imaging range of a face camera and an imaging range of an iris camera. FIG. 7 is a schematic diagram illustrating an example of a visible light filter provided in an illumination unit. FIG. 8 is a schematic diagram illustrating a configuration in which a motor is fixed to a fixed part outside an apparatus. FIG. 9 is a conceptual diagram illustrating a drive direction of the camera according to the second example embodiment. Incidentally, FIG. 4 to FIG. 9, for convenience of explanation, illustrate only main components and do not illustrate the components that are less related to the second example embodiment. FIG. 4 is a view of an imaging apparatus for authentication from the front side (in other words, from an imaging target person side), and FIG. 5 is a view of the imaging apparatus for authentication from the rear side (i.e., a side opposite to FIG. 1).

As illustrated in FIG. 4 and FIG. 5, the camera 20 of the payment system 10 according to the second example embodiment includes an iris camera 210, a face camera 220, an illumination unit 230, a holding part 250, an air cooling fan 260, and a motor 270.

The face camera 220 is configured as a visible light camera for capturing a face image used for face authentication. The iris camera 210 is configured as a near-infrared camera for capturing an iris image used for iris authentication, and has an imaging range (also referred to as a field of view) that is narrower than that of the face camera 220. The face camera 220 and the iris camera 210 are arranged such that their imaging ranges overlap each other, for example, such that the imaging range of the iris camera 210 is positioned near the center of the imaging range of the face camera 220 (see FIG. 6). The face camera 220 and the iris camera 210 are integrally configured as a camera unit 225. The face camera 220 and the iris camera 210 are fixed to the holding part 250 and may be integrally driven by a motor 270 described later.

The illumination unit 230 is configured to emit illumination light (i.e., near-infrared light) for assisting the imaging of the iris camera 210. Incidentally, the illumination unit 230 may be provided with a visible light cut filter that transmits the illumination light (i.e., near-infrared light) but has a low visible light transmittance. The visible light cut filter is provided so as to cover at least a part (desirably a whole) of a light source of the illumination unit 230 (see FIG. 7). In this case, it is possible to reduce the visible light that passes to the outside of the camera 20 (in other words, the imaging target person side), from the illumination unit 230 side. As a result, it is possible to make it difficult to recognize the presence of the illumination unit 230 from the outside of the camera 20. The illumination unit 230 is fixed to the holding part 250 together with the face camera 220 and the iris camera 210, and may be integrally driven with the face camera 220 and the iris camera 210 by the motor 270 described later.

The air cooling fan 260 is a fan for air-blowing in order to cool the camera 20. The air cooling fan 260 may be or may not be fixed to the holding part 250. In other words, the air cooling fan 260 may be configured to be integrally driven with the face camera 220, the iris camera 210, and the illumination unit 230, or not to be integrally driven (in this case, the air cooling fan 260 may be fixed to a fixing member (e.g., a member outside the apparatus) other than the holding part 250). Incidentally, when the cooling is not necessary, the air cooling fan 260 may not be provided.

The motor 270 is coupled to the camera unit 225 (in other words, the face camera 220 and the iris camera 210) and is allowed to integrally drive the orientation of each of the face camera 220, the iris camera 210, and the illumination unit 230 in a vertical direction (see arrows in FIG. 8). Specifically, when the motor 270 is driven, the face camera 220 and the iris camera 210 are driven to rotate coaxially, and the imaging ranges of the face camera 220 and the iris camera 210 are changed by the same angle in the vertical direction. A driving direction of the motor here is merely an example, and the face camera 220, the iris camera 210, and the illumination unit 230 may be driven in a direction other than the vertical direction. Furthermore, more complex movements may be realized by that the motor 270 has a plurality of drive shafts.

The motor 270 may or may not be fixed to the holding part 250. When the motor 270 is not fixed to the holding part 250, the motor 270 itself does not move even when the motor 270 is driven, and the face camera 220, the iris camera 210, and the illumination part 230 fixed to the holding part 250 move. In this case, the motor 270 may be fixed to, for example, a housing 280 or the like. On the other hand, when the motor 270 is fixed to the holding part 250, the motor 270 itself also moves together with the face camera 220, the iris camera 210, and the illumination part 230 fixed to the holding part 250 (in this case, the drive shaft of the motor may be connected to the outside of the apparatus). In this case, the drive shaft of the motor 270 may be fixed to, for example, a fixing part 275 outside the apparatus (see FIG. 8).

As illustrated in FIG. 9, the face camera 220, the iris camera 210, the illumination unit 230, the holding part 250, the air cooling fan 260, and the motor 270 are disposed inside the cylindrical housing 280. In particular, as illustrated in FIG. 9, the driving by the motor 270 is a rotation operation in which a central axis of the housing 280 (i.e., a central axis of the cylinder) is a rotation axis. In this manner, the face camera 220 and the iris camera 210 can be smoothly driven in the housing 280. Even if the motor 270 is driven, only the face camera 220 and the iris camera 210 in the housing 280 move, but the housing 280 itself does not move. This configuration is realized, for example, by a tilt mechanism. In this way, it is possible to make it difficult for the imaging target person to recognize the movement inside the housing 280.

At least a part of the housing 280 (specifically, a part covering the face camera 220 and the iris camera 210) may be formed of a material with a high transmittance to light from the outside and a low transmittance to light from the inside. Specifically, the housing 280 may be configured, for example, as a half mirror or a smoke mirror. As described above, at least a part of the housing 280 functions as a cover unit that adjusts the transmittance, by which it is possible to make it difficult to recognize the movements of the face camera 220 or the iris camera 210 from the outside without deteriorating the image quality of the captured image.

The driving of the motor 270 is controlled by a drive control unit 290. The drive control unit 290 calculates a drive amount of the motor 270 (in other words, a moving amount of the imaging ranges of the face camera 220 and the iris camera 210) to control the driving of the motor 270. A specific method of controlling the motor 270 by the drive control unit 290 will be described in detail later. The drive control unit 290 may be provided outside the housing 280 or inside the housing 280.

(Operation in Imaging)

Figure 10:
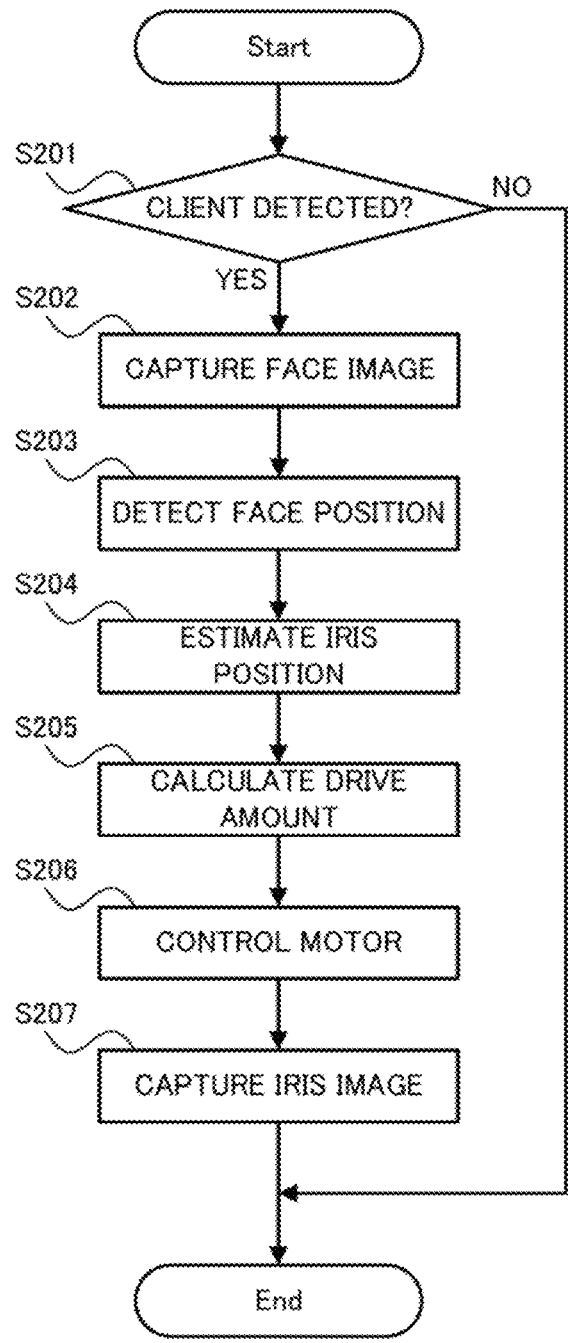
FIG. 10 is a flowchart illustrating a flow of the operation of the camera according to the second example embodiment.
Figure 11A:
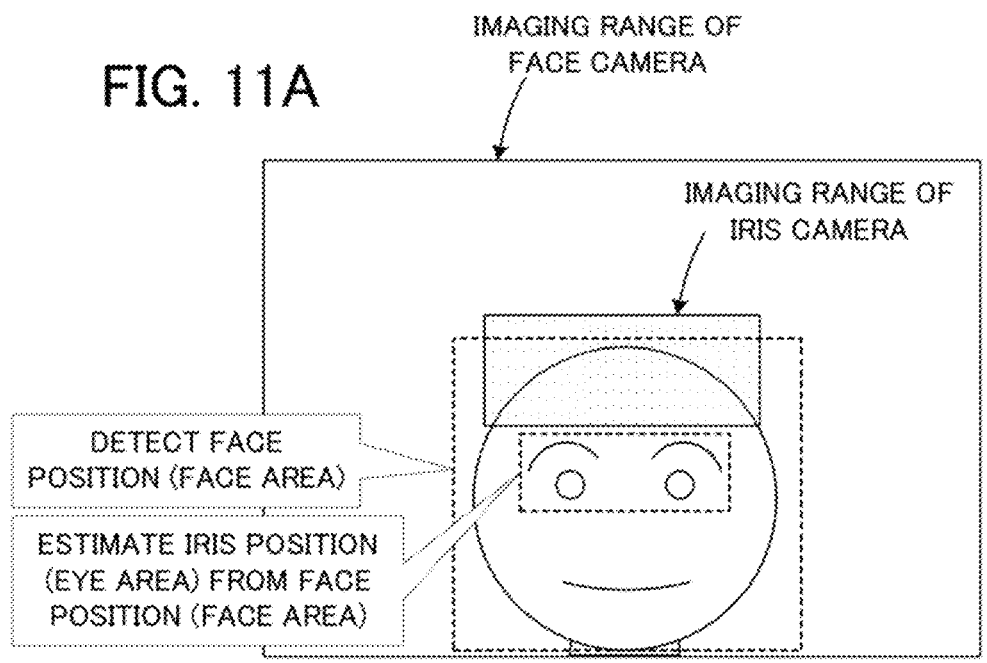
FIG. 11 is a conceptual diagram illustrating an example of a method of adjusting the imaging range on the basis of a face position.
Figure 11B:
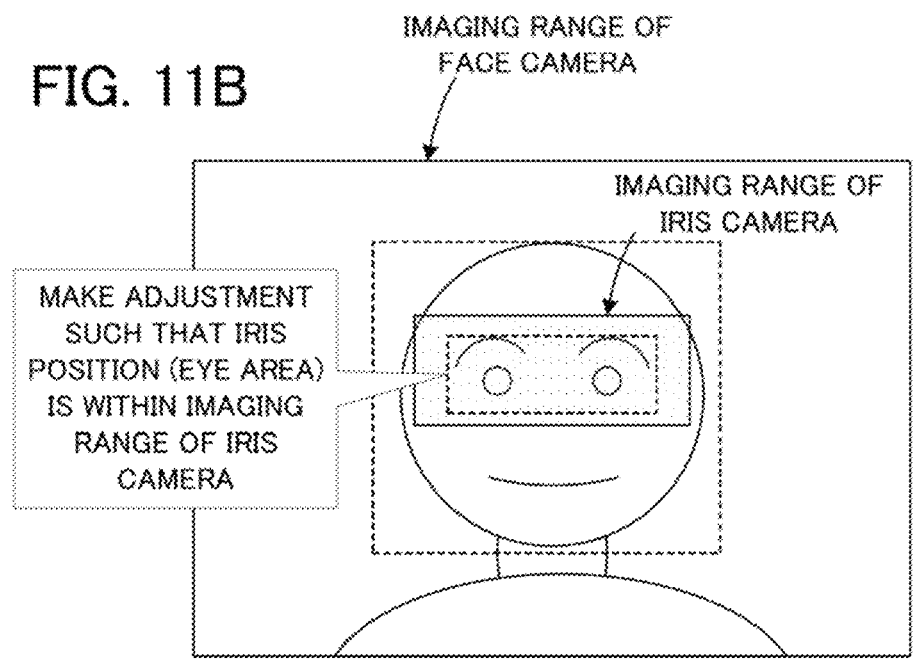

Next, a flow of the operation of the camera 20 provided in the payment system 10 according to the second example embodiment will be described with reference to FIG. 10 and FIG. 11. FIG. 10 is a flowchart illustrating a flow of the operation of the camera according to the second example embodiment. FIG. 11 is a conceptual diagram illustrating an example of a method of adjusting the imaging range on the basis of a face position.

As illustrated in FIG. 10, in operation of the camera 20 according to the second example embodiment, the face camera 220 firstly detects whether or not there is a customer that is an imaging target person (step S201). The presence of a customer may be detected, for example, by a not-illustrated sensor or the like, or may be detected by the face camera 220 itself. Alternatively, the presence of a customer may be detected when the apparatus is operated by the customer. When no customer is detected (the step S201: NO), the subsequent processing is omitted, and a series of steps ends. In this case, the step S201 may be performed again after a lapse of a predetermined period.

When a customer is detected (the step S201: YES), the face camera 220 captures the face image of the customer (step S202). Although the position of the customer's face varies depending on the height and standing position of the customer or the like, it is possible to capture the face image of the customer without particularly adjusting the imaging range because the imaging range of the face camera 220 is relatively widely set. If the face image cannot be normally captured even though a customer is detected, a not-illustrated display unit or the like may be used to guide the customer into the imaging range. Alternatively, if the entire face is not imaged, but is partially imaged (i.e., if a face position can be detected from the face image), as described below, the drive control unit 290 changes the imaging range of the iris camera 210, and then, the face camera 220 may capture the face image again.

When the face image is captured by the face camera 220, the drive control unit 290 obtains the face image from the face camera 220, and detects the face position (also referred to as a face area) of the customer from the face image (step S203). That is, it detects at which position of the imaging range of the face camera 22 the face of the customer is. A detailed description of a specific method of detecting the face position will be omitted here because the existing method can be appropriately adopted thereto.

Subsequently, the drive control unit 290 estimates an iris position (also referred to as an eye area) of the customer on the basis of the detected face position of the customer (step S204). The estimation here can be realized, for example, by storing in advance a relationship between the face position of the customer and the iris position. For example, the drive control unit 290 estimates that the eye area is near the center of the detected face area (see FIG. 11A). Alternatively, the eye(s) may be detected directly from the image on the basis of the position of the face. Once the iris position of the customer is estimated, the drive control 290 calculates the drive amount of the motor 270 so as to allow the customer's iris to be within the imaging range of the iris camera 210 (step S205). In other words, it is calculated to what extent the imaging range of the iris camera 210 is to be moved to allow the customer's iris to be within the imaging range of the iris camera 210.

Subsequently, the drive control unit 290 controls the driving of the motor 270 on the basis of the drive amount of the calculated motor 270 (step S206). This changes the imaging range of the iris camera 210 so that the iris camera 210 can certainly capture the customers' iris image. More specifically, the estimated eye area falls within the imaging range of the iris camera 210 (see FIG. 11B). Then, in that state, the iris camera 210 captures the iris image of the customer (step S207). Since the illumination unit 230 is also driven together with the iris camera 210 (i.e., an irradiation position also moves in accordance with the imaging range of the iris camera 210), it is possible to capture the iris image with a better image quality.

After the drive control unit 290 changes the imaging range of the iris camera 210, the face camera 220 may capture the face image again. Since the iris camera 210 is driven integrally with the face camera 220, if the imaging range of the iris camera 210 is changed, the imaging range of the face camera 220 is also changed to a more appropriate position. Therefore, by capturing the face image again in this timing, it is possible to capture the face image of the customer more appropriately. In this way, for example, even if the face image captured in the step S202 is an image that cannot be used for the face authentication (e.g., an image in which only a part of the face is captured, etc.), the face authentication can be certainly performed by using the face image captured by the face camera 220 after the adjustment.

Technical Effects

Next, technical effects obtained by the payment system 10 according to the second example embodiment will be described.

As described in FIG. 4 to FIG. 11, in the payment system 10 according to the second example embodiment, the face camera 220 for capturing the face image and the iris camera 210 for capturing an iris image are integrally driven. In this way, it is possible to appropriately capture (obtain) the face image and the iris image of the customer who uses the payment system 10.

Third Example Embodiment

The payment system 10 according to a third example embodiment will be described with reference to FIG. 12 and FIG. 13. Incidentally, the third example embodiment differs from the first and second example embodiments described above only in some configurations and operations, and may be the same as the first and second example embodiments in the other parts. Therefore, in the following, a description of the part that overlaps with the example embodiments already described will be omitted accordingly.

(Functional Configuration)

Firstly, a functional configuration of the payment system 10 according to the third example embodiment will be described with reference to FIG. 12. FIG. 12 is a block diagram illustrating the functional configuration of the payment system according to the third example embodiment. In FIG. 12, the same components as those illustrated in FIG. 2 carry the same reference numerals. Out of the components illustrated in FIG. 2, the components that are less related to the third example embodiment are not illustrated.

Figure 12:
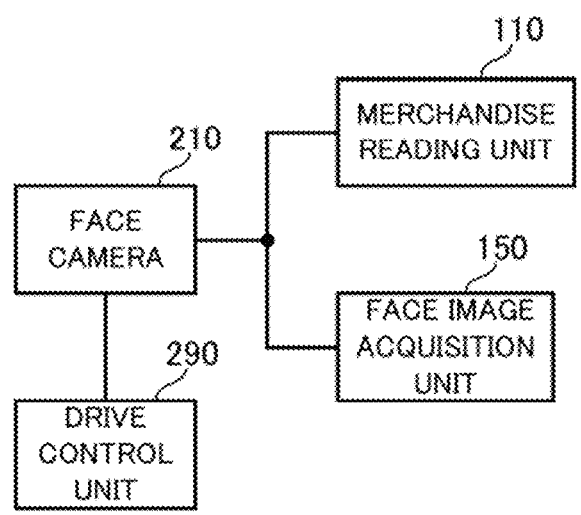
FIG. 12 is a block diagram illustrating a functional configuration of a payment system according to a third example embodiment.

As illustrated in FIG. 12, in the payment system 10 according to the third example embodiment, the merchandise reading unit 110 and the face image acquisition unit 150 are configured to obtain an image captured by the face camera 220. That is, each of the merchandise reading unit 110 and the face image acquisition unit 150 is configured to obtain an image from one common camera.

The merchandise reading unit 110 according to the third example embodiment is configured to read merchandise from the image captured by the face camera 220. For example, the merchandise reading unit 110 performs object recognition for an image that contains merchandise captured by the face camera (hereinafter, appropriately referred to as a "merchandise image"), and recognizes that an object detected from the merchandise image is an article of merchandise. A detailed description of a specific method of the object recognition will be omitted here because the existing technique/technology can be appropriately adopted thereto.

The merchandise image captured by the face camera 220 may not contain a customer's face. That is, the face camera 220 in this case may function as a camera that preferentially images the merchandise that the customer intends to purchase, rather than the customer's face. The face camera 220 is configured to be driven by the drive control unit 290 in order to certainly image the merchandise. Specifically, the face camera 220 is configured to move the imaging range so as to allow an article of merchandise to be within the imaging range. The drive control unit 290 image the merchandise, for example, by driving the face camera 220 in the vertical direction as described in the second example embodiment (e.g., see FIG. 9).

(Display Example when Driving Face Camera)

Next, a display example (an example of presentation to the customer) when driving the face camera 220 will be described with reference to FIG. 13. FIG. 13 is a conceptual diagram illustrating a display example when reading merchandise. Incidentally, FIG. 13 illustrates a display example when the face camera 220 is driven in the vertical direction.

As illustrated in FIG. 13, when the drive control unit 290 drives the face camera 220, the merchandise image captured by the face camera 220 may be displayed to the customer such that a tilt angle of the face camera 220 can be seen. That is, the image captured by the face camera 220 is displayed in an area corresponding to a tilt position on a display unit. Incidentally, a "captured image display area" in FIG. 13 is an area in which the merchandise image captured by the face camera 220 is displayed on the display unit. A "drivable area" indicates an area in which the face camera 220 can be driven (in other words, an area in which the imaging range of the face camera 220 can be moved). An "information display area" is an area in which other various information can be displayed; for example, the merchandise information and information about payment may be appropriately displayed therein.

As illustrated in FIG. 13A, when the tilt position of the face camera 220 is in the middle (in other words, it can be moved up or down), the captured image display area is displayed in the middle of the drivable area. That is, the drivable area is displayed above and below the captured image display area. On the other hand, as illustrated in FIG. 13B, when the tilt position of the face camera 220 is at the upper limit (in other words, when it cannot be moved further up), the captured image display area is displayed at the top of the drivable area. That is, it is displayed such that the drivable area is only below the captured image display area.

By performing the display as described above, it is possible for the customer to intuitively know an imaging situation of the merchandise image, and, for example, it is possible to encourage the customer to move the position of an article of merchandise. For example, if the tilt position of the face camera 220 is at the upper limit, but an article of merchandise is not within the imaging range, it is desired to move the position of the article a little more down in order to appropriately capture the merchandise image. In such a situation, if the above-described display is performed for the customer, it is expected that the customer will spontaneously move down the article of merchandise. Incidentally, in addition to the above-described display example, for example, a message such as "Please move down merchandise" may be displayed.

Technical Effects

Next, technical effects obtained by the payment system 10 according to the third example embodiment will be described.

As described in FIG. 12 and FIG. 13, in the payment system 10 according to the third example embodiment, the reading of merchandise is performed by using the image captured by the face camera 220, and when the image is captured, the face camera 220 is driven so as to image the merchandise. Thus, by using the face camera 220 to read merchandise, it is not necessary to separately provide an apparatus for reading merchandise. Furthermore, by driving the face camera 220 when capturing the merchandise image, it is possible to capture an image that certainly contains the merchandise (even if the imaging range is normally set in anticipation of the position of a face).

Fourth Example Embodiment

The payment system 10 according to a fourth example embodiment will be described with reference to FIG. 14 and FIG. 15. Incidentally, the fourth example embodiment differs from the first to third example embodiments described above only in some configurations and operations, and may be the same as the first to third example embodiments in the other parts. Therefore, in the following, a description of the part that overlaps with the example embodiments already described will be omitted accordingly.

(Functional Configuration)

Firstly, a functional configuration of a payment system 10 according to a fourth example embodiment will be described with reference to FIG. 14. FIG. 14 is a block diagram illustrating the functional configuration of the payment system according to the fourth example embodiment. In FIG. 14, the same components as those illustrated in FIG. 2 carry the same reference numerals.

Figure 14:
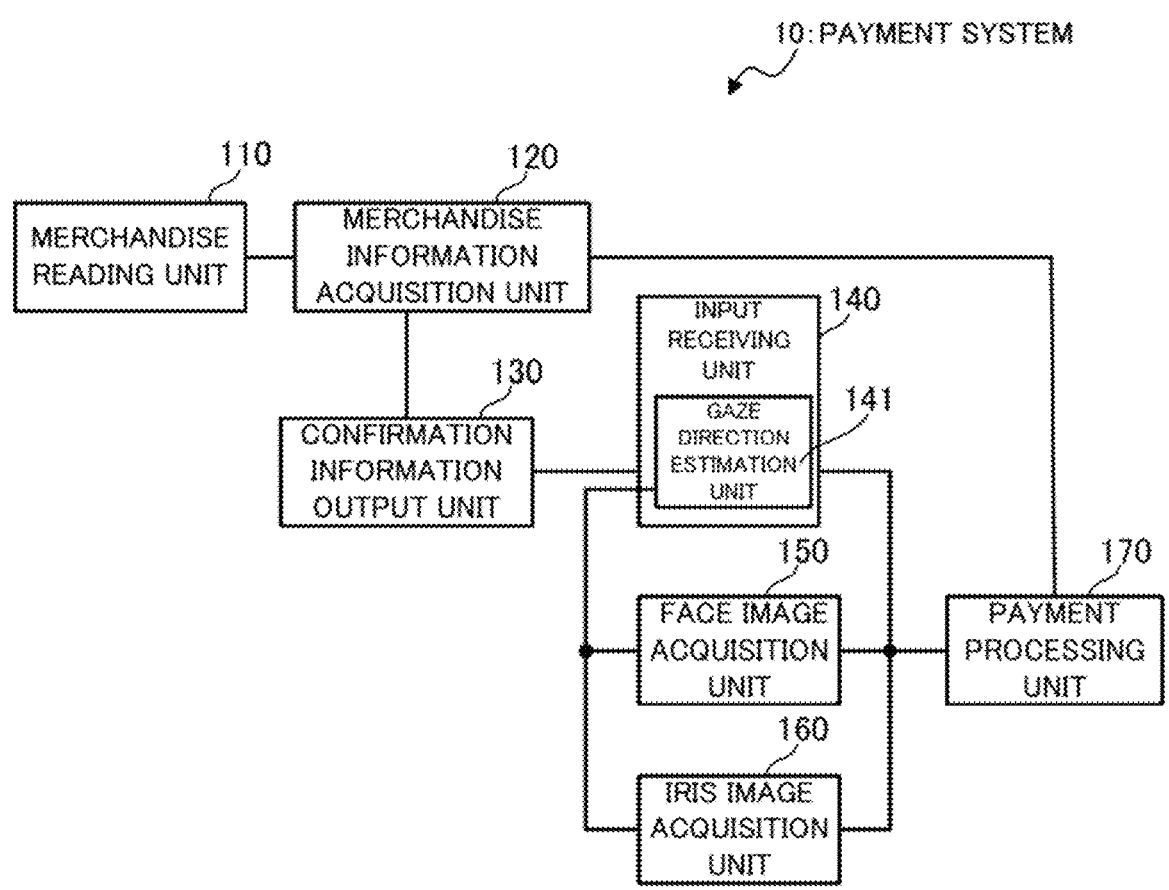
FIG. 14 is a block diagram illustrating a functional configuration of a payment system according to a fourth example embodiment.

As illustrated in FIG. 14, the payment system 10 according to the fourth example embodiment includes the merchandise reading unit 110, the merchandise information acquisition unit 120, the confirmation information output unit 130, the input receiving unit 140, the face image acquisition unit 150, the iris image acquisition unit 160, and the payment processing unit 170, as processing blocks for realizing its functions. In particular, the input receiving unit 140 according to the fourth example embodiment includes a gaze direction estimation unit 141.

The gaze direction estimation unit 141 is configured to estimate a gaze direction of a customer, by using at least one of the face image obtained by the face image acquisition unit 150 and the iris image obtained by the iris image acquisition unit 160. When the gaze direction estimation unit 141 estimates the gaze direction, it is desirable to adjust the position of the camera such that the center of a coordinate system of the camera 20 is an eye position of the customer (the center of both eyes). A detailed description of a method of estimating the gaze direction from the face image and the iris image will be omitted here because the existing technique/technology can be appropriately adopted thereto. The input receiving unit 140 according to the fourth example embodiment receives information about the gaze direction of the customer estimated by the gaze direction estimation unit 141, as an input from the customer indicating that the customer has a payment intention.

The input receiving unit 140 may receive information indicating that the gaze direction is a predetermined direction (e.g., a right direction with respect to the front of the customer) as information indicating that the customer has a payment intention, and may receive information indicating that the direction is other than the predetermined direction (e.g., a left direction with respect to the front of the customer) as information indicating that the customer has no payment intention, for example.

Furthermore, the input receiving unit 140 may receive the information about the gaze direction as the input from the customer, when the gaze direction of the customer is maintained for a predetermined time. For example, when the gaze direction of the customer is maintained in the same direction for a predetermined time (e.g., about a few seconds), the information about the gaze direction may be received as the input from the customer. The predetermined time may be a fixed value set in advance, or may be a value that varies depending on the situation. For example, if the gaze direction of the customer is inclined significantly in a predetermined direction, the predetermined time may be set shorter (e.g., 2 seconds), and if it is inclined slightly in a predetermined direction, the predetermined time may be set longer (e.g., 4 seconds). Furthermore, a predetermined range may be provided in the predetermined direction. For example, all the range that is 90 degrees to the right from the front of the customer may be set to be "right". However, a numerical value is not limited to this, and the direction may be one of left, up, and down. Furthermore, in this case, even if the gaze direction of the customer moves, if the gaze direction moves within this range, then, this may be a condition in which "the gaze direction is maintained in the same direction."

Incidentally, as in the second and third example embodiments described above, when driving the camera 20 (i.e., when changing the imaging range of the camera), a degree of difficulty in estimating the gaze direction varies depending on the tilt angle of the camera. For example, when the tilt angle of the camera 20 is deviated from the horizontal at a higher ratio, the camera 20 and the face of the customer do not face each other more likely, which makes it difficult to estimate the gaze direction. Furthermore, when the camera 20 is directed down from above, it is difficult to estimate the gaze direction due to downcast eyes. In such a case, the input receiving unit 140 may change the above-described predetermined time in accordance with the difficulty in determining the gaze direction (i.e., the tilt angle of the camera 20). For example, as the tilt angle increases, the predetermined time may be set longer. Alternatively, the input receiving unit may change a threshold for determining the gaze direction of the customer (e.g., a threshold with respect to an angle of the gaze direction) in accordance with the difficulty in determining the gaze direction (i.e., the tilt angle of the camera 20). For example, as the tilt angle increases, the threshold for determining the gaze direction may be changed more significantly (i.e., without significantly shifting the gaze direction, facing in that direction may not be recognized). Alternatively, a method or algorithm used for gaze estimation may be changed in accordance with the tilt angle. For example, in the case of a deep-learning based estimation method, a gaze estimation engine which is made to learn for each tilt angle may be constructed and used by switching in accordance with the tilt angle.

When the gaze direction cannot be normally estimated by the gaze direction estimation unit 141 (e.g., when the angle of the line of sight does not exceed the threshold), the customer may be guided to shift the line of sight more significantly. For example, when displaying a gaze position marker (a pointer indicating where the customer is looking at) on a display apparatus, sensitivity to an angular change of the line of sight may be reduced such that the marker does not move unless the line of sight is significantly moved. Alternatively, a voice, message, or the like may be outputted so as to significantly shift the line of sight.

(Flow of Operation)

Next, a flow of the operation of the payment system 10 according to the fourth example embodiment will be described with reference to FIG. 15. FIG. 15 is a flowchart illustrating the flow of the operation of the payment system according to the fourth example embodiment. In FIG. 15, the same steps as illustrated in FIG. 3 carry the same reference numerals.

Figure 15:
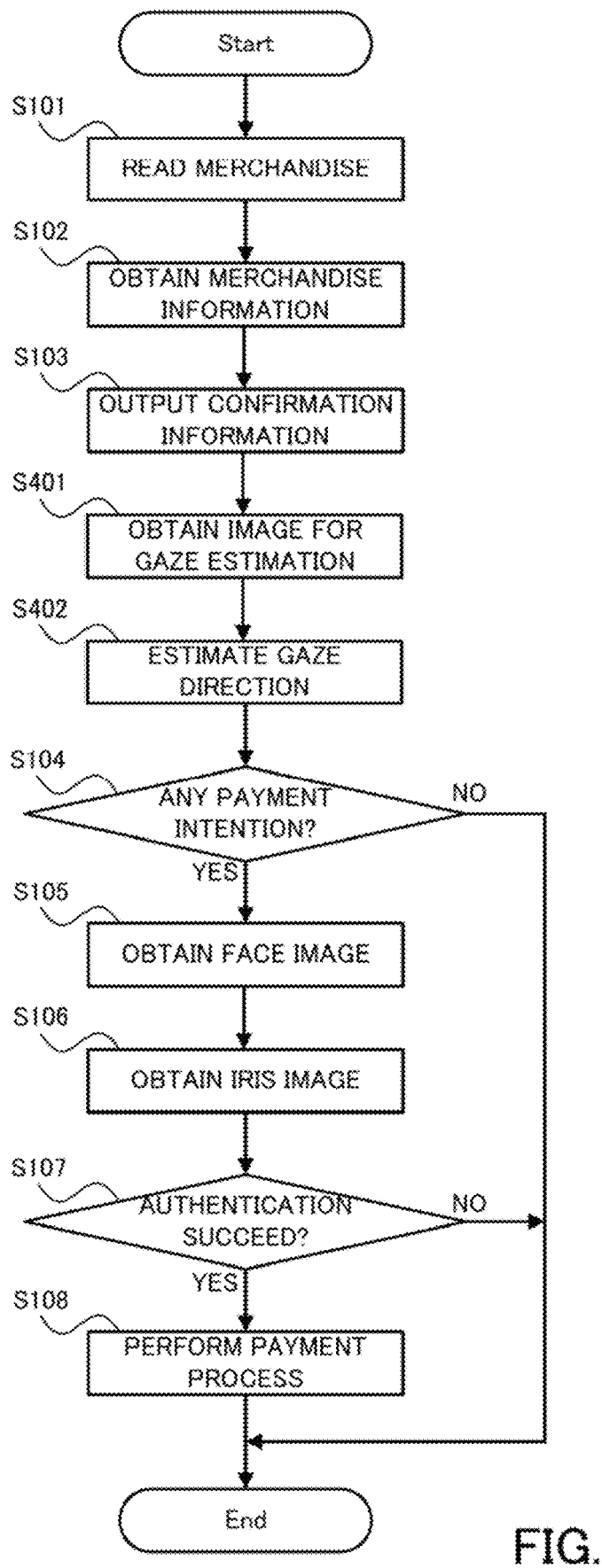
FIG. 15 is a flowchart illustrating a flow of the operation of the payment system according to the fourth example embodiment.

As illustrated in FIG. 15, in operation of the payment system 10 according to the fourth example embodiment, the merchandise reading unit 110 firstly reads merchandise (step S101). Then, the merchandise information acquisition unit 120 obtains the merchandise information about the merchandise read by the merchandise reading unit 110 (step S102).

Subsequently, the confirmation information output unit 130 outputs the confirmation information for confirming the intention of payment (step S103). Confirming the intention of payment includes, for example, confirming whether or not a merchandise list is correct (e.g., at least one of amount of money, merchandise name, quantity, etc.). Especially in the fourth example embodiment, at least one of the face image acquisition unit 150 and the iris image acquisition unit 160 obtains the face image and the iris image for estimating the gaze direction of the customer (step S401). Then, the gaze direction estimation unit 141 estimates the gaze direction of the customer on the basis of at least one of the face image and the iris image obtained (step S402).

Subsequently, the input receiving unit 140 determines whether or not the customer has an intention of payment by the biometric authentication on the basis of the gaze direction of the customer (step S104). When it is determined that the customer does not have an intention of payment by the biometric authentication (the step S104: NO), a series of steps ends. On the other hand, when it is determined that the customer has an intention of payment by the biometric authentication (the step S104: YES), the face image acquisition unit 150 obtains the face image of the customer (step S105). Furthermore, the iris image acquisition unit 160 obtains the iris image of the customer (step S106). When using the face image and the iris image obtained when estimating the gaze direction, the above-described step S105 and step S106 may be omitted.

Subsequently, the payment processing unit 170 performs the authentication process for the customer on the basis of at least one of the face image and the iris image obtained (step S107). When the authentication process for the customer does not succeed (the step S107: NO), a series of steps ends. On the other hand, when the authentication process for the customer succeeds (the step S107: YES), the payment processing unit 170 performs the payment process for the merchandise by using the merchandise information (step S108).

After the step S104: YES, information may be outputted to allow the customer to select whether to make a payment by the biometric authentication or to make a payment by means other than the biometric authentication. For example, a guidance "Do you want to make a payment by biometric authentication?" and buttons of "Yes" and "No" may be displayed. When the customer selects "Yes", it moves on to the step S105. Here, when "No" is selected, a screen for selecting other payment methods (e.g., cash, electronic money, credit card, etc.) may be displayed. In addition, a selection screen including the payment by the biometric authentication and the payment by means other than the biometric authentication (e.g., a button of "biometric authentication" and at least one button of "cash," "electronic money," and "credit card") may be displayed together with the guidance "Do you want to make a payment by biometric authentication?" In addition, the confirmation information for confirming the intention of payment may be outputted, including the information for allowing the customer to select whether to make a payment by the biometric authentication or to make a payment by means other than the biometric authentication.

Between the step S107: YES and the step S108, information indicating whether or not to perform the payment process may be outputted. For example, when the authentication process for the customer succeeds, a screen for confirming with the customer whether or not to perform the payment process is displayed. This screen display may include at least one of a payment amount, the customer's personal ID, and the customer's name, or may display only the information for confirming whether or not to perform the payment process. The information for confirming whether or not to perform the payment process is, for example, a confirm button and a return button, and performs the payment process in accordance with the input from the customer, or returns to a previous processing screen (e.g., a screen for displaying a list of read articles of merchandise). Here, a button to cancel the payment process may be displayed in place of or in addition to the return button.

Technical Effects

Next, technical effects obtained by the payment system 10 according to the fourth example embodiment will be described.

As described in FIG. 14 and FIG. 15, in the payment system 10 according to the fourth example embodiment, the customer's payment intention is determined on the basis of the gaze direction of the customer. In this way, it is possible to determine the payment intention without the customer touching and operating the apparatus. Thus, even when the customer's hands are full, for example, by holding articles of merchandise, it is possible to appropriately determine the payment intention.

Fifth Example Embodiment

The payment system 10 according to a fifth example embodiment will be described with reference to FIGS. 16 to FIG. 18. Incidentally, the fifth example embodiment differs from the first to fourth example embodiments described above only in some configurations and operations, and may be the same as the first to fourth example embodiments in the other parts. Therefore, in the following, a description of the part that overlaps with the example embodiments already described will be omitted accordingly.

(Functional Configuration)

Firstly, a functional configuration of the payment system 10 according to the fifth example embodiment will be described with reference to FIG. 16. FIG. 16 is a block diagram illustrating the functional configuration of the payment system according to a fifth example embodiment. Incidentally, in FIG. 16, the same components as those illustrated in FIG. 14 carry the same reference numerals.

Figure 16:
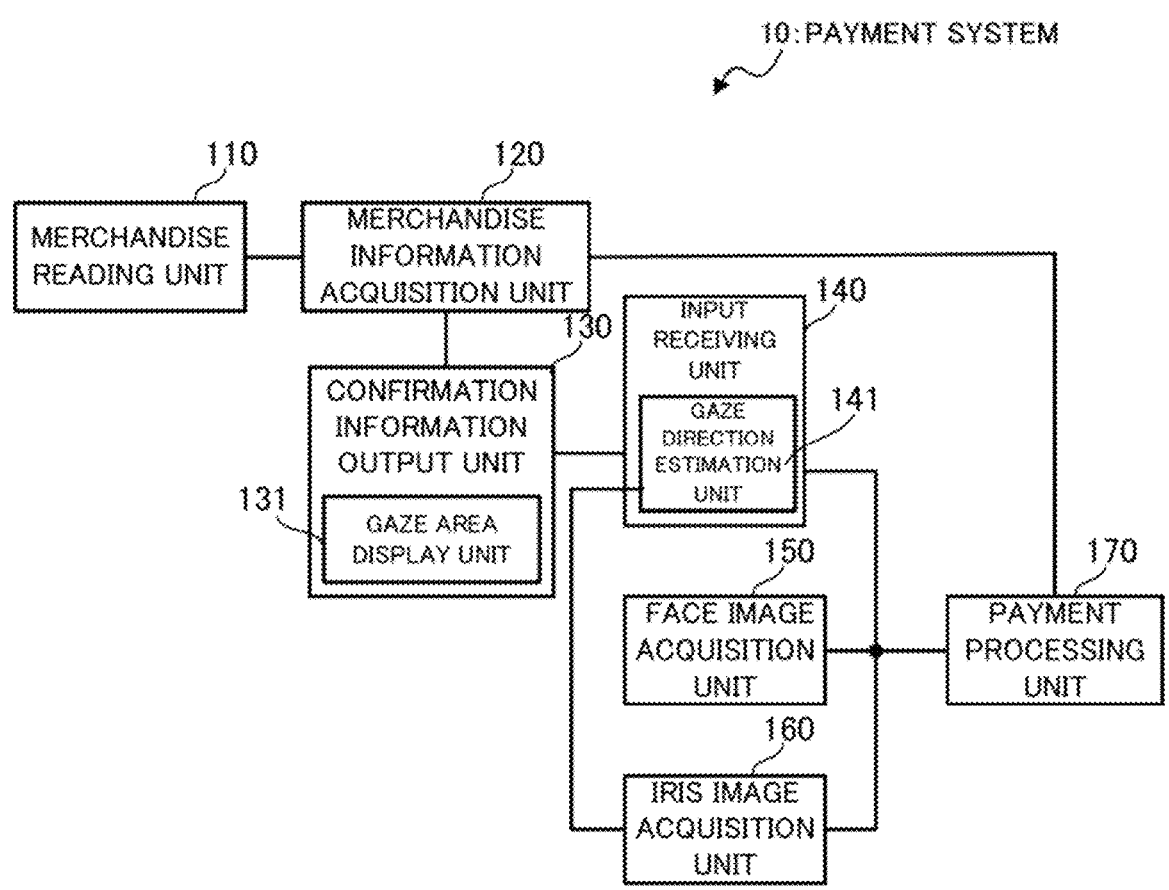
FIG. 16 is a block diagram illustrating a functional configuration of a payment system according to a fifth example embodiment.

As illustrated in FIG. 16, the payment system 10 according to the fifth example embodiment includes the merchandise reading unit 110, the merchandise information acquisition unit 120, the confirmation information output unit 130, the input receiving unit 140, the face image acquisition unit 150, the iris image acquisition unit 160, and the payment processing unit 170, as processing blocks for realizing its functions. The input receiving unit 140 according to the fifth example embodiment includes the gaze direction estimation unit 141, as in the fourth example embodiment.

Especially in the fifth example embodiment, the confirmation information output unit 130 includes a gaze area display unit 131.

The gaze area display unit 131 is configured to display a gaze area, as the confirmation information for confirming the payment intention with a customer. The gaze area display unit 131 may display the gaze area on a display or the like, which is, for example, the output apparatus 16 (see FIG. 1). The gaze area is an area displayed to encourage the customer to move the gaze direction. The gaze area may be displayed as at least one area corresponding to the payment intention, but a plurality of gaze areas may be displayed. For example, only one gaze area corresponding to the gaze direction when the customer has a payment intention may be displayed. Alternatively, a first gaze area corresponding to the gaze direction when the customer has a payment intention and a second gaze area corresponding to the gaze direction when the customer has no payment intention may be displayed.

(Display of Gaze Area)

Next, with reference to FIG. 17 and FIG. 18, a display example of the gaze area by the gaze area display unit 131 described above will be specifically described. FIG. 17 is a conceptual diagram illustrating a display example of the gaze area. FIG. 18 is a conceptual diagram illustrating a display example of the gaze area that takes into account the position of the camera.

Figure 17A:
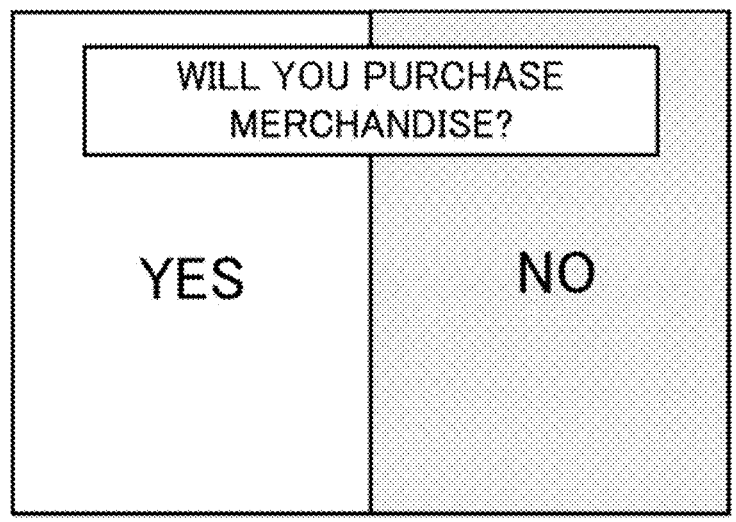
FIG. 17 is a conceptual diagram illustrating a display example of a gaze area.
Figure 17B:

As illustrated in FIG. 17A, the gaze area may be displayed as a left-half area and a right-half area of the display. Specifically, the left half of the display is an area corresponding to the gaze direction when the customer has a payment intention, and when the customer looks at the left half of a screen of the display (i.e., directs or changes the line of sight to the left), an input indicating that the customer has a payment intention is received. On the other hand, the right half of the screen is an area corresponding to the gaze direction when the customer has no payment intention, and when the customer looks at the right half of the screen (i.e., directs or changes the line of sight to the right), an input indicating that the customer has no payment intention is received. As illustrated in FIG. 17B, the gaze area may be displayed on a part of the display. Specifically, it may be displayed as a button-like area.

Figure 18A:
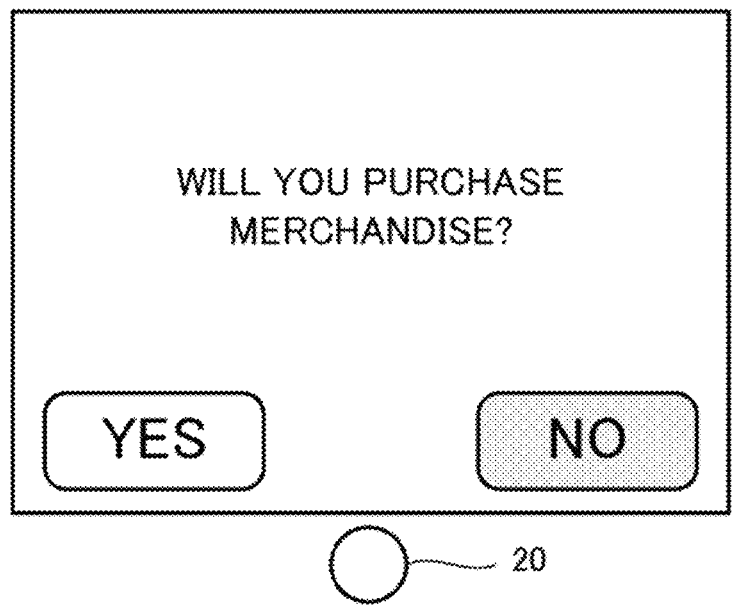
FIG. 18 is a conceptual diagram illustrating a display example of the gaze area that takes into account the position of the camera.
Figure 18B:
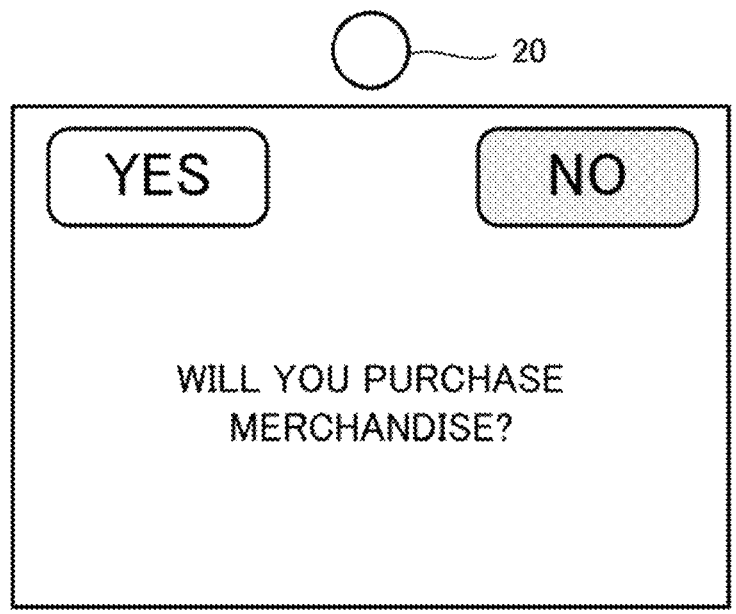

As illustrated in FIG. 18, the display position of the gaze area may be determined by the position of the camera 20. Specifically, it may be displayed on a side close to the camera 20 in the display. For example, in the example illustrated in FIG. 18A, the camera 20 is disposed below the display. In such cases, the gaze area may be located on a lower side of the display. On the other hand, in the example illustrated in FIG. 18B, the camera 20 is disposed above the display. In such cases, the gaze area may be located on an upper side of the display. Placing the gaze area as described above makes it easy to determine the gaze direction from the image captured by the camera 20. Specifically, when gazing at the gaze area, the angle of a gaze position with respect to the camera 20 is larger, and it is thus easy to determine whether the gaze direction is on a right side or a left side.

Technical Effects

Next, technical effects obtained by the payment system 10 according to the fifth example embodiment will be described.

As described in FIG. 16 to FIG. 18, in the payment system 10 according to the fifth example embodiment, the gaze area for confirming the customer's intention of payment is displayed. In this way, it is possible to encourage the customer to look at the gaze area, and it is thus possible to appropriately determine the payment intention from the customer's line of sight.

Sixth Example Embodiment

The payment system 10 according to a sixth example embodiment will be described with reference to FIG. 19 and FIG. 20. Incidentally, the sixth example embodiment differs from the fifth example embodiment described above only in some configurations and operations, may be the same as the first to fifth example embodiments in the other parts. Therefore, in the following, a description of the part that overlaps with the example embodiments already described will be omitted accordingly.

(Functional Configuration)

Firstly, a functional configuration of the payment system 10 according to the sixth example embodiment will be described with reference to FIG. 19. FIG. 19 is a block diagram illustrating the functional configuration of the payment system according to a sixth example embodiment. Incidentally, in FIG. 19, the same components as those illustrated in FIG. 16 carry the same reference numerals.

Figure 19:
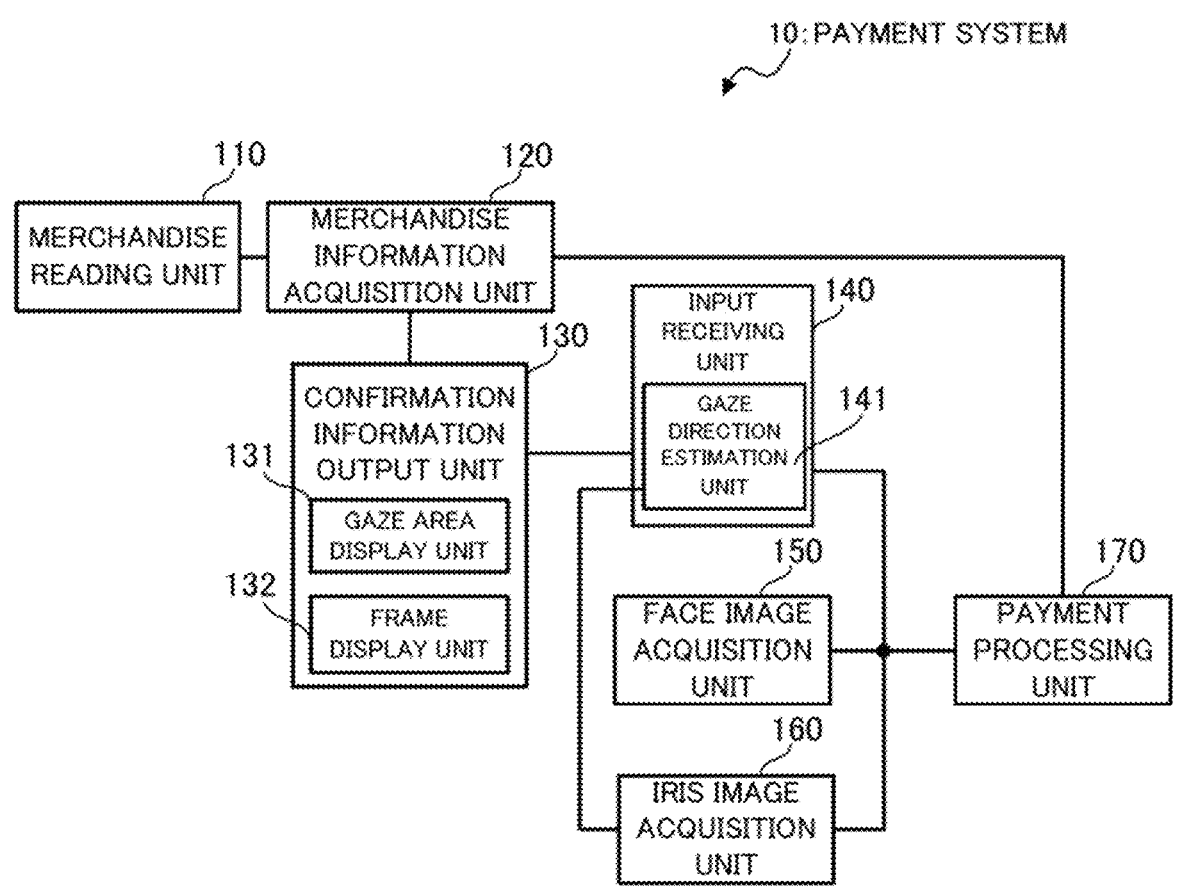
FIG. 19 is a block diagram illustrating a functional configuration of a payment system according to a sixth example embodiment.

As illustrated in FIG. 19, the payment system 10 according to the sixth example embodiment includes the merchandise reading unit 110, the merchandise information acquisition unit 120, the confirmation information output unit 130, the input receiving unit 140, the face image acquisition unit 150, the iris image acquisition unit 160, and the payment processing unit 170, as processing blocks for realizing its functions. The input receiving unit 140 according to the sixth example embodiment includes the gaze direction estimation unit 141, as in the fourth and fifth example embodiments. Especially in the sixth example embodiment, the confirmation information output unit 130 further includes a frame display unit 132 in addition to the gaze area display unit 131 described in the fifth example embodiment.

The frame display unit 132 is configured to display a frame that gradually converges from the outside of the gaze area to the outline of the gaze area in accordance with a time length in which the customer gazes at the gaze area. The frame display unit 132 may start to display the frame, for example, at a timing when it can be determined that the gaze direction of the customer is directed to one gaze area. The frame display unit 132 may end the display of the frame at a timing when the size of the frame becomes the same as (overlaps with) the outline of the gaze area, or may continue to display the frame that has the same size as (overlaps with) the outline of the gaze area. Incidentally, a speed at which the frame converges may be a value set in advance, or may be a value that varies depending on the gaze direction of the customer. For example, when the customer shifts the line of sight significantly in the direction of the gaze area, the frame may converge relatively quickly, and when the customer shifts the line of sight slightly in the direction of the gaze area, the frame may converge relatively slowly. Furthermore, a speed of moving the frame may not be constant, and may be changed in the middle. For example, the frame may be moved quickly at the beginning of the convergence, and as it approaches the gaze area, the speed of moving may be lowered. This allows the customer to quickly recognize the gaze area, and effectively impresses on the customer the necessity to continue to gaze at the gaze area steadily for some time.

(Example of Frame Display)

Next, with reference to FIG. 20, a specific description will be given to an example of display of the frame by the frame display unit 132 described above. FIG. 20 is a conceptual diagram illustrating a display example of the frame that gradually converges to the gaze area.

Figure 20:
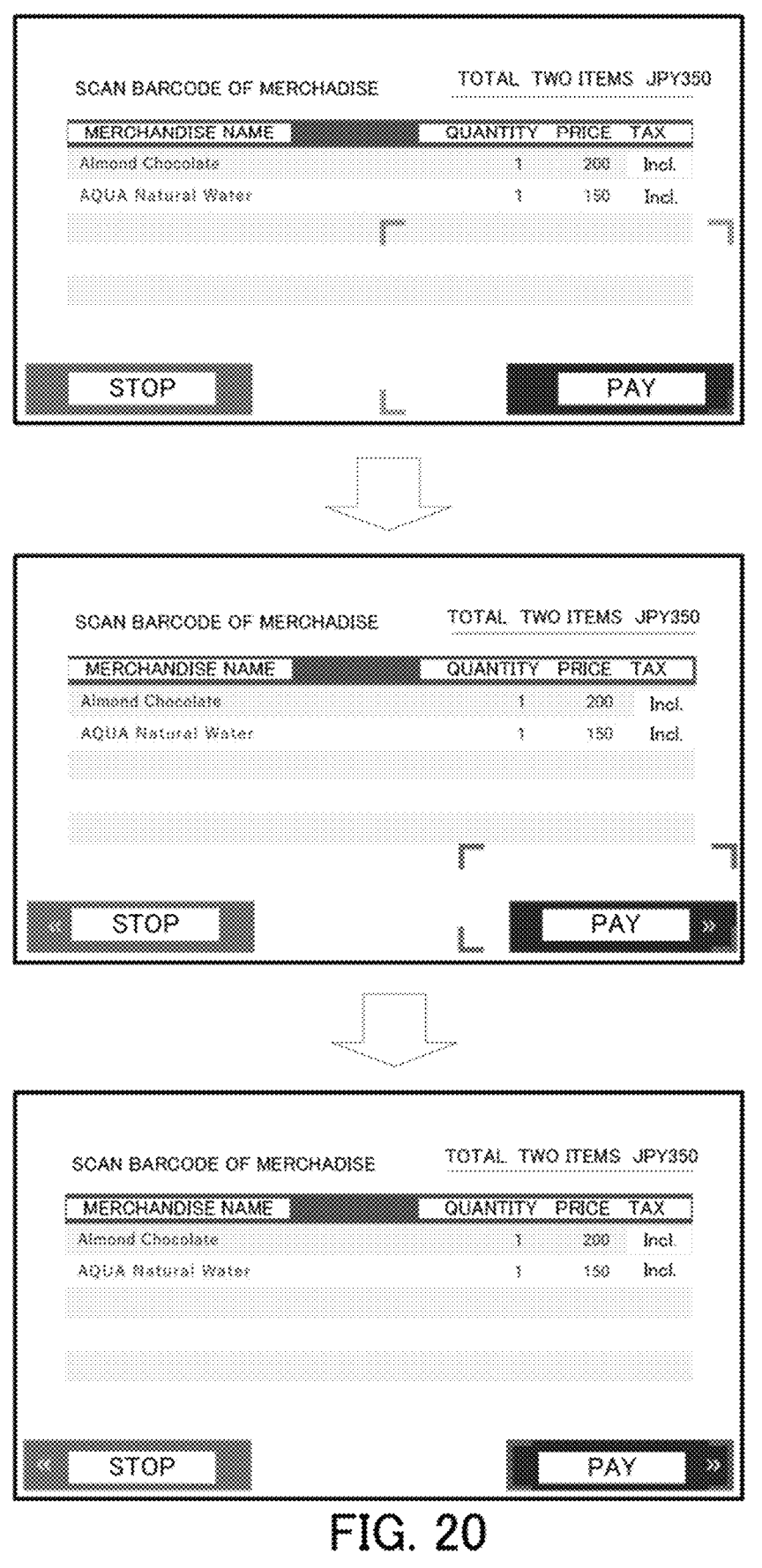

In the example illustrated in FIG. 20, the information about merchandise and payment (e.g., name, number of articles, price, etc. of the read merchandise) is displayed near the center of the display. In addition, a "stop" button at which the customer gazes when having no payment intention is displayed in a lower left of the display. A "payment" button at which the customer gazes when having a payment intention is displayed in a lower right of the display. That is, in this case, the button is the gaze area. In such a situation, when the customer gazes at the payment button, a frame that is larger than the pay button is firstly displayed outside the pay button. Then, as the customer continues to gaze at the payment button, the frame gradually converges to the pay button. That is, as long as the customer continues to gaze at the pay button, the frame becomes smaller toward the pay button. Then, it stops in a condition in which the frame overlaps the outline of the payout button, and continues to display the frame for a predetermined time. Incidentally, when the customer changes the gaze direction in the middle, the display of the frame may be stopped. When the gaze direction of the customer changes to another gaze area, a new frame may be displayed on the outside of this another gaze area. For example, a customer who continues to gaze at the pay button starts to gaze at the stop button in the middle, the frame that is displayed on the pay button side may disappear, and a frame may be newly displayed on the stop button side. Incidentally, when the customer changes the gaze direction in the middle, the frame may gradually become larger toward its original size. Furthermore, in this case, when the gaze direction returns to the payment button again, the frame may stop increasing in size at that timing when the gaze direction returns, and the frame may gradually become smaller toward the payment button again. Furthermore, the color of the frame may be different between when gazing at the payment button and when gazing at the stop button. For example, the frame may be displayed in green when gazing at the payment button side, and the frame may be displayed in orange when gazing at the stop button side.

The display in the sixth example embodiment may be performed at the time of confirming the payment intention in the S104 in FIG. 15, or may be performed when the information indicating whether or not to perform the payment process is outputted between the step S107: YES and the step S108.

Technical Effects

Next, technical effects obtained by the payment system 10 according to the sixth example embodiment will be described.

As described in FIG. 19 and FIG. 20, in the payment system 10 according to the sixth example embodiment, the frame that gradually converges to the gaze area is formed. By displaying the frame on the side of an area at which the customer gazes, the customer can know how the gaze direction is recognized. In addition, the frame gradually converges to the outline of the gaze area, by which the line of sight of the customer is directed more to the gaze area. For example, even if the gaze direction is shifted slightly to the gaze area side at first, it is possible to guide the customer to shift the gaze direction significantly to the gaze area side by allowing the frame to gradually converge. Therefore, it is possible to more appropriately determine the gaze direction of the customer.

Seventh Example Embodiment

The payment system 10 according to a seventh example embodiment will be described with reference to FIG. 21 and FIG. 22. Incidentally, the seventh example embodiment differs from the fifth and sixth example embodiments described above only in some configurations and operations, and may be the same as the first to sixth example embodiments in the other parts. Therefore, in the following, a description of the part that overlaps with the example embodiments already described will be omitted accordingly.
(Functional Configuration)

Firstly, a functional configuration of the payment system 10 according to the seventh example embodiment will be described with reference to FIG. 21. FIG. 21 is a block diagram illustrating a functional configuration of a payment system according to a seventh example embodiment. Therefore, in FIG. 21, the same reference numerals are given to the same elements as the components illustrated in FIG. 16.

Figure 21:
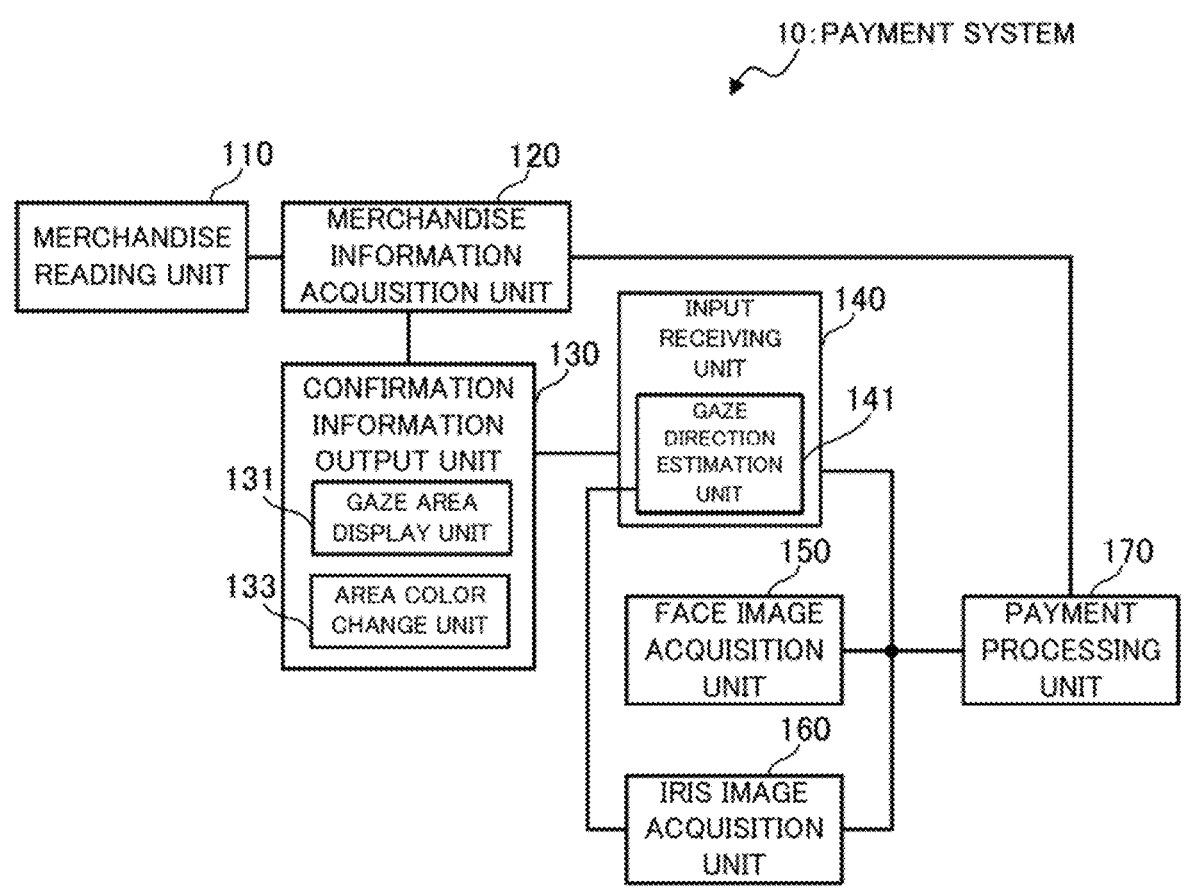
FIG. 21 is a block diagram illustrating a functional configuration of a payment system according to a seventh example embodiment.

As illustrated in FIG. 21, the payment system 10 according to the seventh example embodiment includes the merchandise reading unit 110, the merchandise information acquisition unit 120, the confirmation information output unit 130, the input receiving unit 140, the image acquisition unit 150, the iris image acquisition unit 160, and the payment processing unit 170, as processing blocks for realizing its functions. The input receiving unit 140 according to the seventh example embodiment includes the gaze direction estimation unit 141, as in the fourth to sixth example embodiment. Especially in the seventh example embodiment, the confirmation information output unit 130 further includes an area color change unit 133 in addition to the gaze area display unit 131 described in the fifth example embodiment.

The area color change unit 133 is configured to gradually change the color of the gaze area toward the outside of the screen (in other words, toward a side opposite to the other gaze area) in accordance with the time length in which the customer gazes at the gaze area. The color after the change is preferably a color that allows the customer to easily recognize that the color is changed. The color after the change may be a conspicuous color such as, for example, red or yellow, or a complementary color of the color before the change, or the like. The area color change unit 133 may start to change the color of the gaze area, for example, at a timing when it is determined that the gaze direction of the customer is directed to one gaze area. Incidentally, a speed of changing the color of the gaze area may be a value set in advance, or may be a value that varies depending on the gaze direction of the customer. For example, when the customer shifts the line of sight significantly in the direction of the gaze area, the color may be changed relatively quickly, and when the customer shifts the line of sight slightly in the direction of the gaze area, the color may be changed relatively slowly. Furthermore, the speed of changing the color may not be constant, and may be changed in the middle. For example, the speed of changing the color may be set high at first, and then, the speed of changing the color may be reduced gradually. This allows the customer to quickly recognize the gaze area, and effectively impresses on the customer the necessity to continue to gaze at the gaze area steadily for some time.

(Example of Color Change)

Next, the color change of the gaze area by the area color change unit 133 described above will be specifically described with reference to FIG. 22. FIG. 22 is a conceptual diagram illustrating a display example in which the color of the gaze area is gradually changed toward the outside of the screen.

Figure 22:
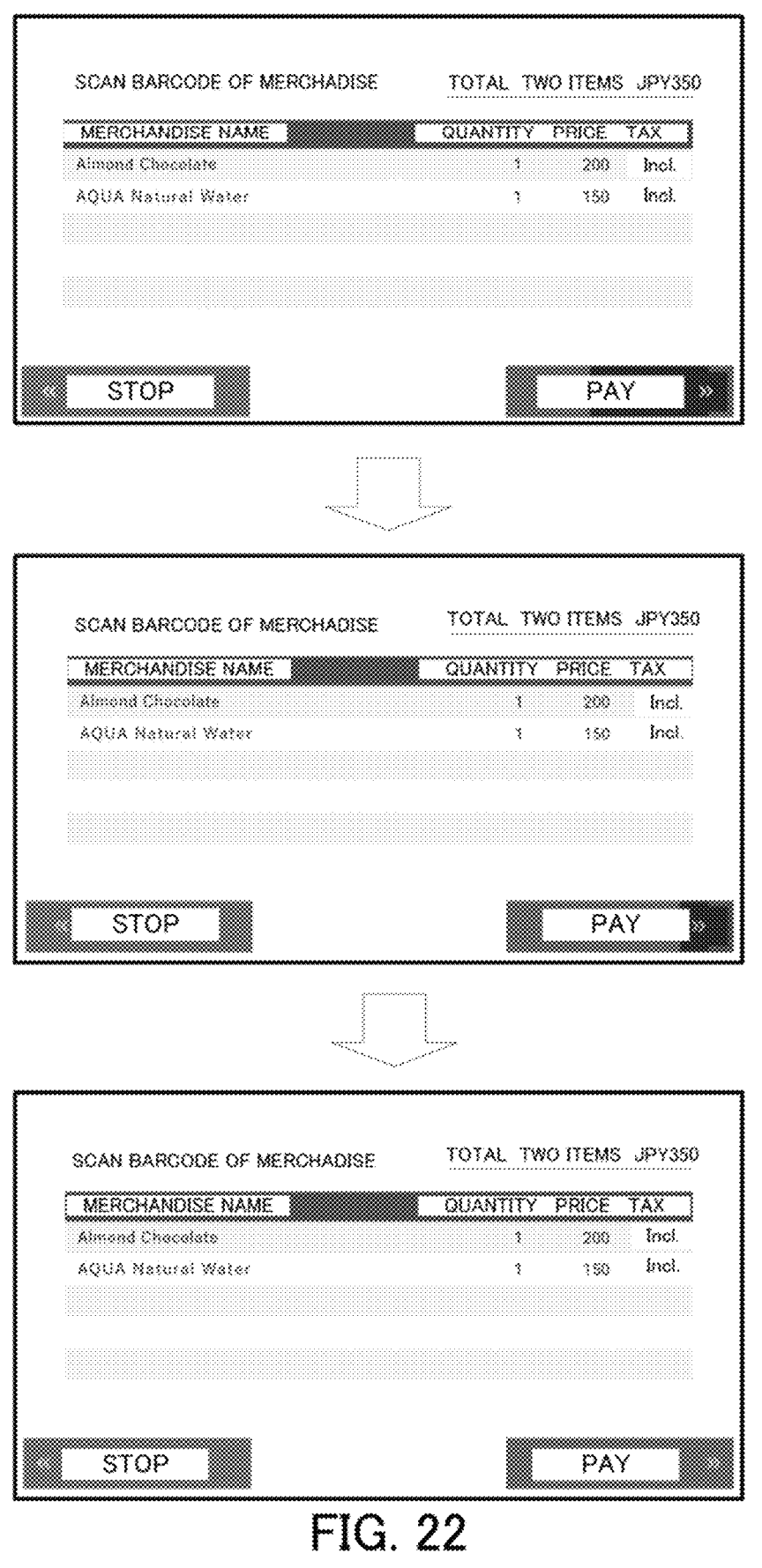

In the example illustrated in FIG. 22, as in FIG. 20, the information about merchandise and payment (e.g., name, number of articles, price, etc. of the read merchandise) is displayed near the center of the display. In addition, a "stop" button at which the customer gazes when having no payment intention is displayed in the lower left of the display. A "payment" button at which the customer gazes when having a payment intention is displayed in the lower right of the display. In such a situation, when the customer gazes at the pay button, the color of the gaze area is gradually changed from an inner part of the pay button (i.e., a left edge of the pay button). Then, as the customer continues to gaze at the pay button, the color of the gaze area changes to the outside of the screen, and eventually, the color of the pay button is all changed. That is, such a display that a meter rises as the customer continues to gaze at the pay button is performed. Incidentally, when the customer changes the gaze direction in the middle, the change of the color may be stopped. If the color change is stopped, the color of the gaze area may return to its original color. When the gaze direction of the customer changes to another gaze area, the color of this another gaze area may be changed. For example, a customer who continues to gaze at the pay button starts to gaze at the stop button in the middle, the color of the pay button returns to its original color, and the color change of the stop button may be newly started. Incidentally, when the customer changes the gaze direction in the middle, the color of the gaze area may be changed toward the inside of the display. Furthermore, in this case, once the gaze direction returns to the pay button again, the color change toward the inside may be stopped at that timing when the gaze direction returns, and the color may be changed toward the outside again. Furthermore, the color to change may be different between when gazing at the payment button and when gazing at the stop button. For example, the color may be changed into green when gazing at the payment button side, and the color may be changed into orange when gazing at the stop button side.

Incidentally, the color change of the gaze area described above may be performed in combination with the frame display described in the sixth example embodiment (see FIG. 20). For example, after the frame displayed by the frame display unit 132 converges to the gaze area, the color change by the area color change unit 133 may be started.

The display in the seventh example embodiment may be performed at the time of confirming the payment intention in the S104 in FIG. 15, or may be performed when the information indicating whether or not to perform the payment process is outputted between the step S107: YES and the step S108.

Technical Effects

Next, technical effects obtained by the payment system 10 according to the seventh example embodiment will be described.

As described in FIG. 21 and FIG. 22, in the payment system 10 according to the seventh example embodiment, the color of the gaze area is gradually changed toward the outside of the screen. In this way, the customer's line of sight is directed more outward the screen (in other words, a side opposite to the other gaze area). For example, even if the gaze direction is shifted slightly to the gaze area side at first, it is possible to guide the customer to shift the gaze direction significantly to the gaze area side by gradually changing the color of the gaze area. Therefore, it is possible to more appropriately determine the gaze direction of the customer.

Eighth Example Embodiment

The payment system 10 according to an eighth example embodiment will be described with reference to FIG. 23 and FIG. FIG. 24. Incidentally, the payment system 10 according to the eighth example embodiment differs from the first to seventh example embodiments described above only in some configurations and operations, and may be the same as the first to seventh example embodiments in the other parts. Therefore, in the following, a description of the part that overlaps with the example embodiments already described will be omitted accordingly.

(Functional Configuration)

Firstly, a functional configuration of the payment system 10 according to the eighth example embodiment will be described with reference to FIG. 23. FIG. 23 is a block diagram illustrating the functional configuration of the payment system according to the eighth example embodiment. In FIG. 23, the same components as those illustrated in FIG. 2 carry the same reference numerals.

Figure 23:
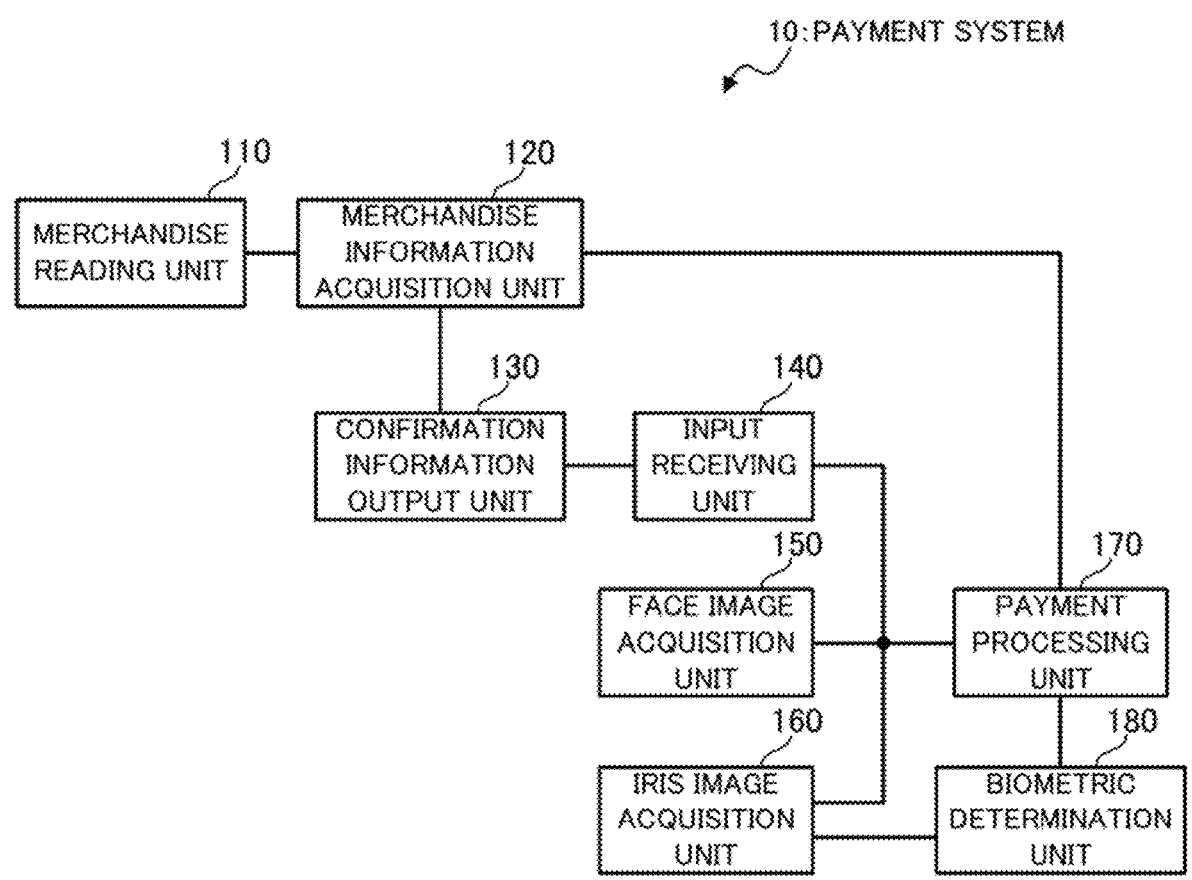
FIG. 23 is a block diagram illustrating a functional configuration of a payment system according to an eighth example embodiment.

As illustrated in FIG. 23, the payment system 10 according to the eighth example embodiment includes the merchandise reading unit 110, the merchandise information acquisition unit 120, the confirmation information output unit 130, the input receiving unit 140, the face image acquisition unit 150, the iris image acquisition unit 160, the payment processing unit 170, and a biometric determination unit 180, as processing blocks for realizing its functions. That is, the payment system 10 according to the eighth example embodiment further includes the biometric determination unit 180 in addition to the configuration of the first example embodiment (see FIG. 2). The biometric determination unit 180 may be implemented, for example, in the above-described processor 11 (see FIG. 1).

The biometric determination unit 180 is configured to determine biological likeness of the customer on the basis of the movement of the customer's line of sight estimated from the iris image obtained by the iris image acquisition unit 160. The "biological likeness" here is a degree indicating a possibility that the customer is a living body. The biometric determination unit 180 may determine the biological likeness depending on whether or not the movement of the customer's line of sight is similar to that of the living body (in other words, such a movement that cannot be reproduced by spoofing). In addition, in addition to the movement of the customer's line of sight, the biometric determination unit 180 may perform the biometric determination by using other information (e.g., information obtained from the face image of the customer or the like). A determination result of the biometric determination unit 180 is configured to be outputted to the payment processing unit 170.

The payment processing unit 170 according to the eighth example embodiment is configured to change an aspect of the authentication process on the basis of the determination result of the biometric determination unit 180 (i.e., the biological likeness of the customer). Specifically, the payment processing unit 170 is configured to change the aspect of the authentication process depending on whether or not the biological likeness is higher than a predetermined threshold. The "predetermined threshold" here is a threshold for determining whether or not the biological likeness is high enough to determine that the customer is a living body (e.g., not spoofing), and it is sufficient to determine an appropriate value by prior experiments, simulations, or the like and set it in advance. A change in the authentication process depending on the biological likeness is described in detail below.

(Flow of Operation)

Next, a flow of the operation of the payment system 10 according to the eighth example embodiment will be described with reference to FIG. 24. FIG. 24 is a flowchart illustrating a flow of the operation of the payment system according to the eighth example embodiment. In FIG. 24, the same steps as those illustrated in FIG. 3 carry the same reference numerals.

Figure 24:
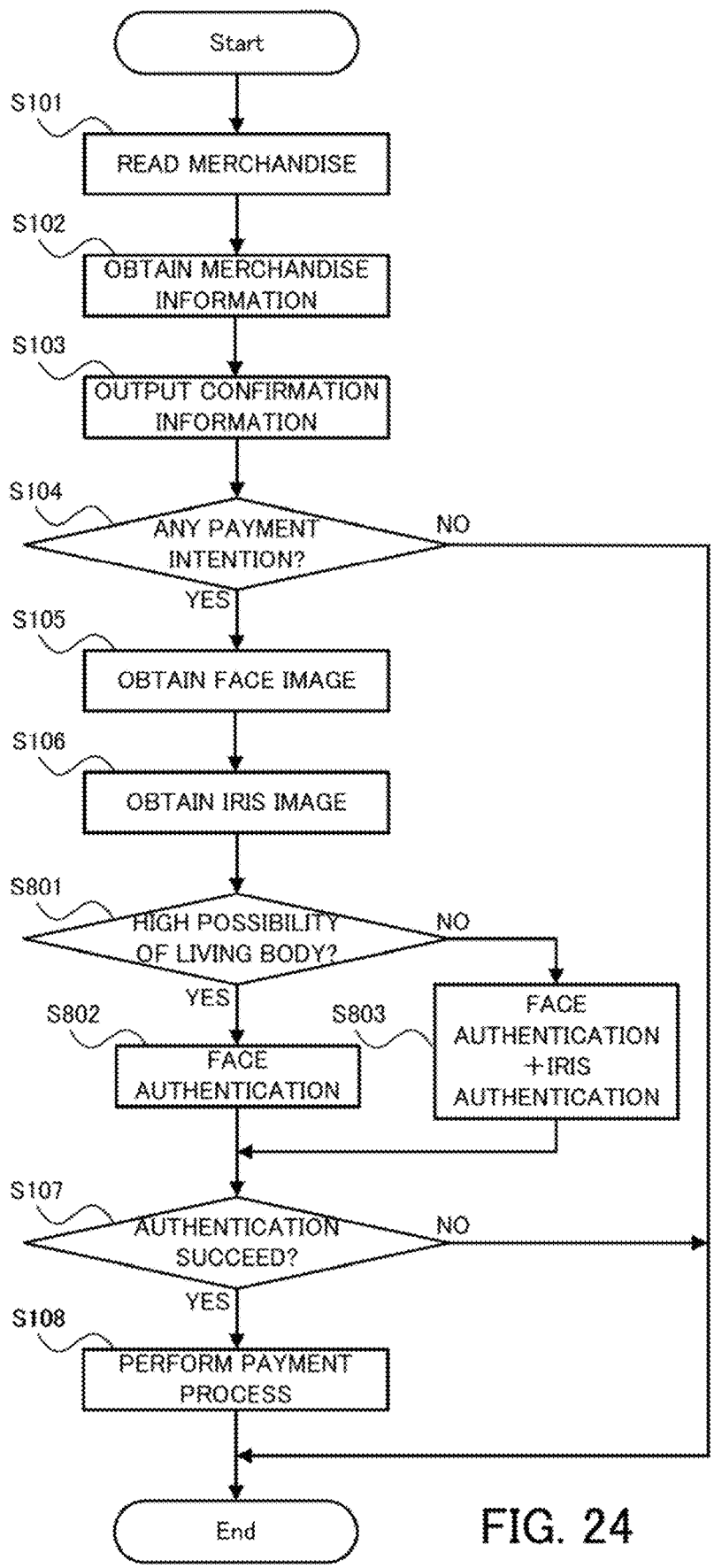
FIG. 24 is a flowchart illustrating a flow of the operation of the payment system according to the eighth example embodiment.

As illustrated in FIG. 24, in operation of the payment system 10 according to the eighth example embodiment, the merchandise reading unit 110 firstly reads merchandise (step S101). Then, the merchandise information acquisition unit 120 obtains the merchandise information about the merchandise read by the merchandise reading unit 110 (step S102).

Subsequently, the confirmation information output unit 130 outputs the confirmation information for confirming the intention of payment (step S103). Then, the input receiving unit 140 determines whether or not the customer has an intention of payment using biometric authentication on the basis of the input from the customer (step S104).

When it is determined that the customer does not have an intention of payment by the biometric authentication (the step S104: NO), a series of steps ends. On the other hand, when it is determined that the customer has an intention of payment by the biometric authentication (the step S104: YES), the face image acquisition unit 150 obtains the face image of the customer (step S105). Furthermore, the iris image acquisition unit 160 obtains the iris image of the customer (step S106).

Here, in particular, the biometric determination unit 180 determines the biological likeness of the customer on the basis of the movement of the line of sight estimated from the iris image (step S801). When the biological likeness of the customer is higher than the predetermined threshold (step S801: YES), the payment processing unit 170 performs authentication based on the face image obtained by the face image acquisition unit 150 (step S802). On the other hand, when the biological likeness of the customer is lower than the predetermined threshold (step S801: NO), the payment processing unit 170 performs authentication based on the face image obtained by the face image acquisition unit 150 and the iris image obtained by the iris image acquisition unit 160 (step S803).

As a result of the step S802 (i.e., face authentication only) or the step S803 (i.e., face authentication and iris authentication), when the authentication of the customer does not succeed (the step S107: NO), a series of steps ends. On the other hand, when the authentication of the customer succeeds (the step S107: YES), the payment processing unit 170 performs the payment process for the merchandise by using the merchandise information (step S108). Incidentally, FIG. 24 describes a case where the face authentication is used in the step S802, but the iris authentication may be performed instead of the face authentication.

Technical Effects

Next, technical effects obtained by the payment system 10 according to the eighth example embodiment will be described.

As described in FIG. 23 and FIG. 24, in the payment system 10 according to the eighth example embodiment, the biometric determination based on the gaze direction of the customer is performed, and a different authentication process is performed in accordance with the determination result. This simplifies the authentication process to reduce a processing load while performing the payment process, when the biological likeness of the customer is high. In addition, a stricter authentication process can be performed to prevent an unauthorized payment process caused by spoofing, etc. from being performed, when the biological likeness of the customer is low.

<Other Display Examples>

Figure 25:
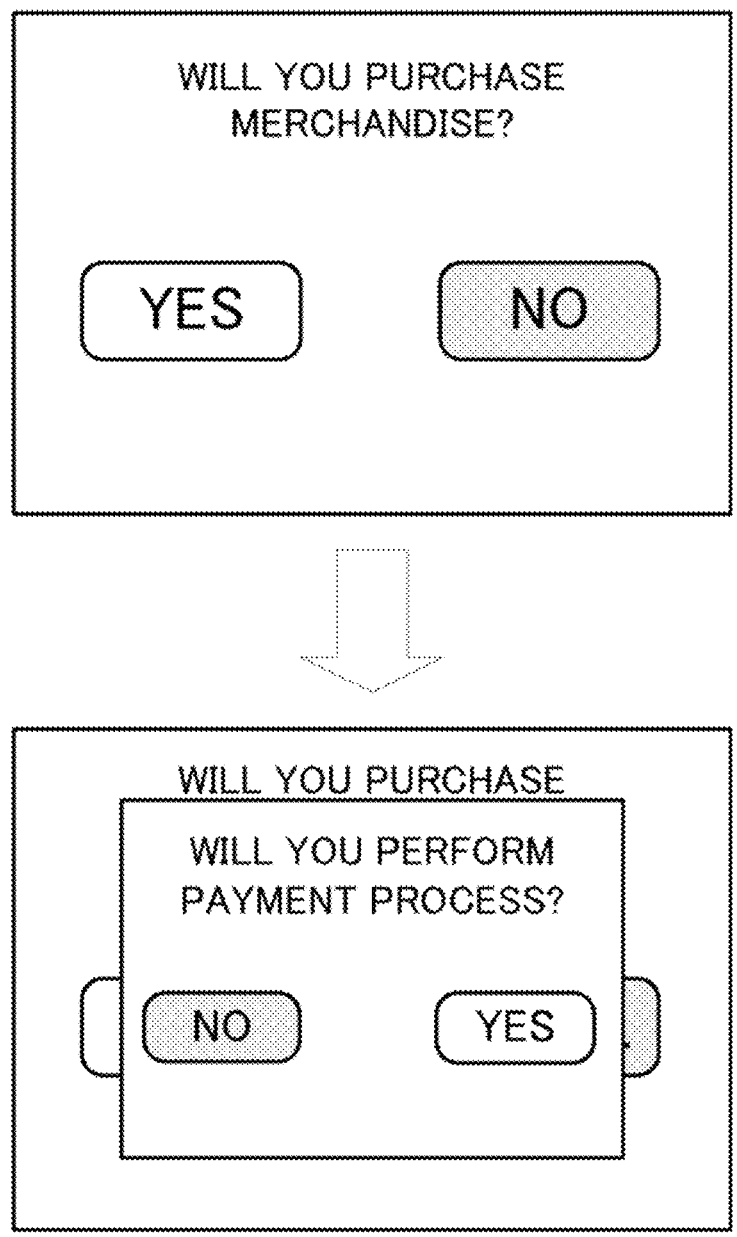
FIG. 25 is a conceptual diagram illustrating a display example when making final confirmation of a payment intention.

Other display examples applicable to the payment system 10 according to the first to eighth example embodiments described above will be described with reference to FIG. 25 to FIG. 28. FIG. 25 is a conceptual diagram illustrating a display example when making final confirmation of the payment intention. FIG. 26 is a conceptual diagram illustrating a display when setting a distance between the customer and the camera in a proper range. FIG. 27 is a conceptual diagram illustrating a display example for notifying the customer of the gaze direction at the time of iris authentication. FIG. 28 is a conceptual diagram illustrating a display example for requesting the customer to take off a wearing article. FIG. 29 is a conceptual diagram illustrating a display example for notifying the customer to open the eyes.

As illustrated in FIG. 25, the payment system 10 according to the example embodiments may display the gaze area to confirm the customer's payment intention, and then may confirm the payment intention again before actually performing the payment process. In this case, when confirming the final payment intention, the gaze area may be displayed in the same way as that when firstly confirming the payment intention. In particular, the gaze area when confirming the final payment intention may be displayed such that the position of each area is opposite, as compared to the position when firstly confirming the payment intention. In the example illustrated in FIG. 25, when firstly confirming the payment intention, the button of "YES (i.e., with a payment intention)" is displayed on the left side, and the button of "NO (i.e., without a payment intention)" is displayed on the right side. Then, when confirming the final payment intention, the button of "YES (i.e., with a payment intention)" is displayed on the right side, and the button of "NO (i.e., without a payment intention)" is displayed on the left side. In this way, the customer moves the line of sight whenever requested to confirm the payment intention, and if, for example, the customer remains the gaze direction unintentionally, the payment process is not performed. Therefore, it is possible to effectively prevent that the payment is made against the customer's intention.

When confirming the final payment intention, a different method from that when firstly confirming the payment intention (i.e., other than the line of sight) may be used to make confirmation. For example, when confirming the final payment intention, the payment intention may be confirmed by nodding the head or shaking the head (or by tilting the head). In this case, the direction of the face is detected by the face camera 220 in addition to the position of the face, and how the direction has changed in time series is determined to determine the action of the head.

Figure 26A:
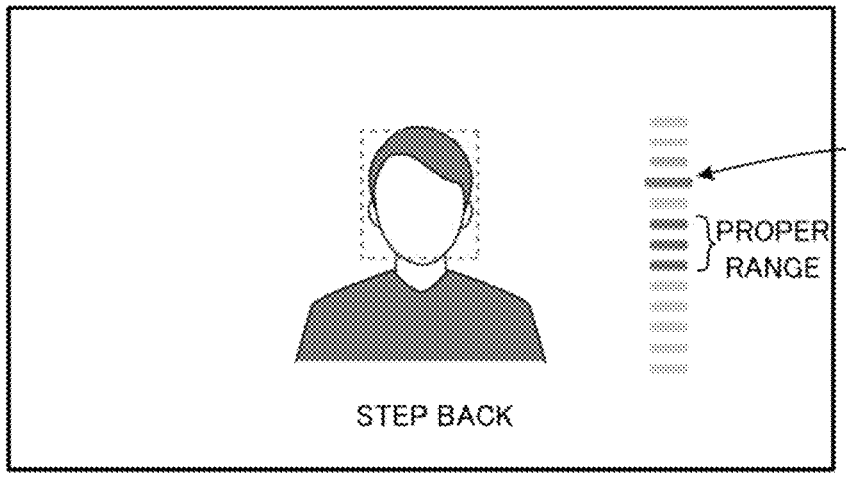
FIG. 26 is a conceptual diagram illustrating a display when setting a distance to the camera in a proper range.
Figure 26B:
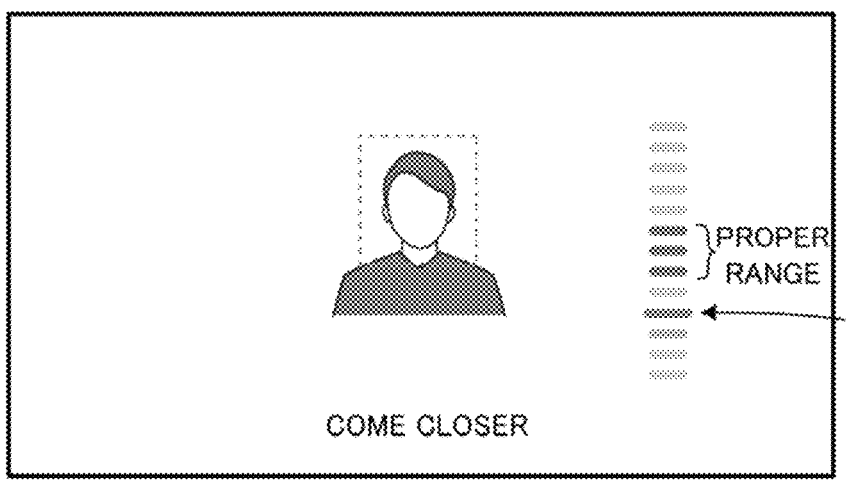
Figure 26C:
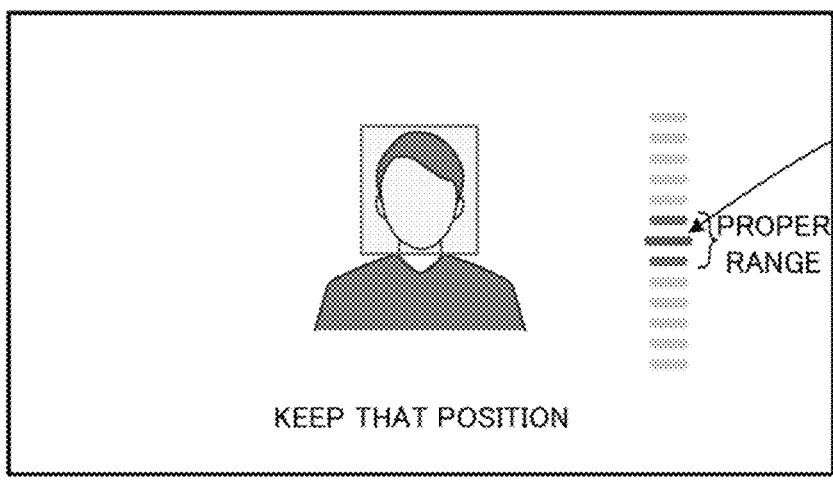
Figure 27:
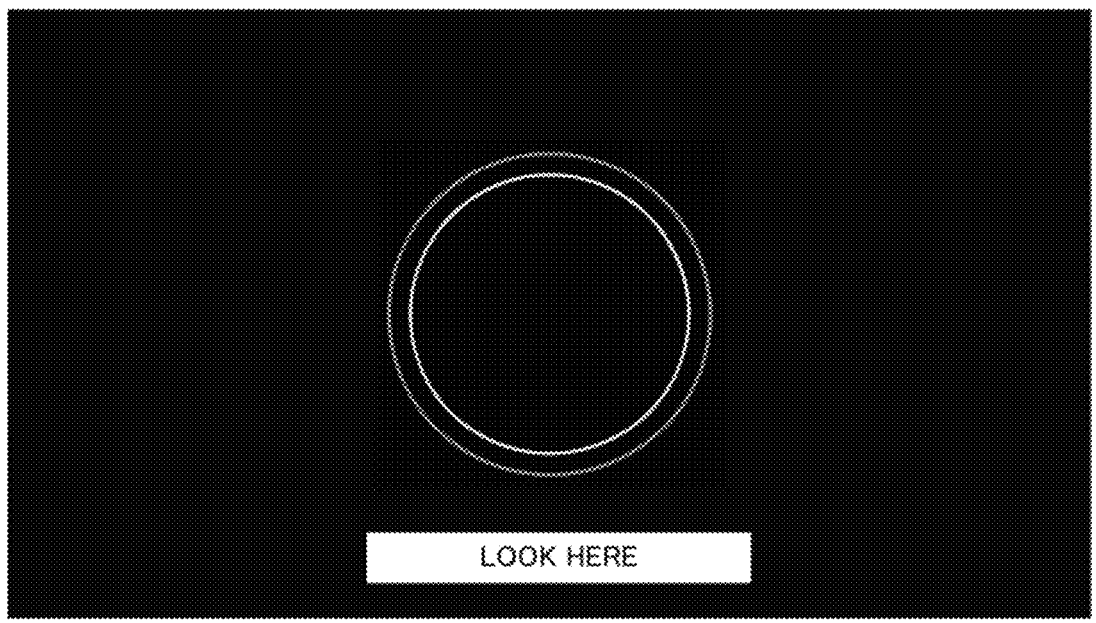
FIG. 27 is a conceptual diagram illustrating a display example for notifying a customer of a gaze direction at the time of iris authentication.

As illustrated in FIG. 26, when the face camera 220 captures the face image of the customer, a display may be made to properly set the distance between the face camera 220 and the customer. Specifically, an indicator indicating a relation between the current position of the customer and a proper range may be displayed. The indicator shows a result of estimating the distance between the customer and the camera, and shows that the distance is smaller toward the upper side and the distance is larger toward the lower side. Then, a part corresponding to the estimated distance in the indicator is highlighted (e.g., brightened, slightly widened in width, or flashed). For example, in the example illustrated in FIG. 26A, the customer is too close to the face camera 220, so that the face of the customer protrudes from a frame within which the face is. In such a case, the display indicating the current position of the indicator is displayed above the proper range. In addition, a message of "Step back" may be displayed to the customer. In the example illustrated in FIG. 26B, the customer is too far from the face camera 220, so that the face of the customer is considerably smaller than the frame within which the face is. In such a case, the display indicating the current position of the indicator is displayed below the proper range. In addition, a message of "Come closer" may be displayed to the customer. In the example illustrated in FIG. 26C, the face camera 220 and the customer are in the proper range, so that the face of the customer is just within the frame within which the face is. In such a case, the display indicating the current position of the indicator is displayed within the proper range. Also, a message of "Keep that position" may be displayed to the customer. Such a display encourages the customer to move the standing position, and makes it possible to perform the imaging of the face image at an appropriate distance. The color of the indicator may be changed between the proper range and the other range. For example, the indicator may be displayed in green in the proper range, and may be displayed in orange in the other range.

The distance between the customer and the camera may be measured by using a distance sensor, or may be estimated from the image captured by the camera. In the latter case, the estimation may be based on a distance between facial feature points and the size of a partial area. For example, the distance between the camera and the customer may be estimated on the basis of a distance between the eyes, or the distance between the camera and the customer may be estimated from the size of the detected iris.

As illustrated in FIG. 27, when capturing the iris image of the customer by using the iris camera 210, a display may be made to properly guide the gaze direction of the customer. Specifically, a mark (e.g., a double-circle-like mark in FIG. 27) indicating a direction at which the customer is to gaze may be displayed. Here, the double circle may increase, decrease, or may periodically fluctuate (oscillate) in size. This allows the customer's line of sight to be directed in that direction. In addition to the mark, a message such as "Look here" may be displayed. In this way, it is possible to encourage the customer to move the gaze direction in the proper direction and fix the gaze direction as it is. Thus, it is possible to capture an appropriate iris image. It is also possible to change a speed of oscillating in size depending on the direction of the line of sight. For example, the speed is further reduced as the line of sight comes closer to the center of the double circle, and the speed of oscillating may be increased as the line of sight deviates farther from the center. Thus, it is possible to feed back to the customer whether the direction of the line of sight is proper, and it is possible to guide the line of sight in a more proper direction. Alternatively, the speed may be changed in accordance with the distance between the customer and the iris camera 210. In other words, the speed of oscillating may be increased when the distance is too close or too far, and the speed of oscillating may be reduced when the distance is proper. This makes it possible to feed back to the customer whether or not the distance to the camera is proper and to image the iris at a more proper position.

Figure 28A:
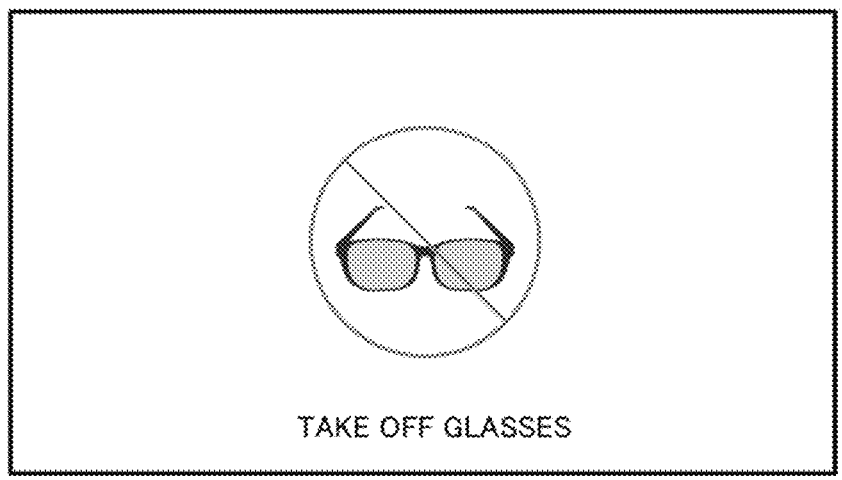
FIG. 28 is a conceptual diagram illustrating a display example for requesting the customer to take off a wearing article.
Figure 28B:
Figure 28C:
Figure 29:
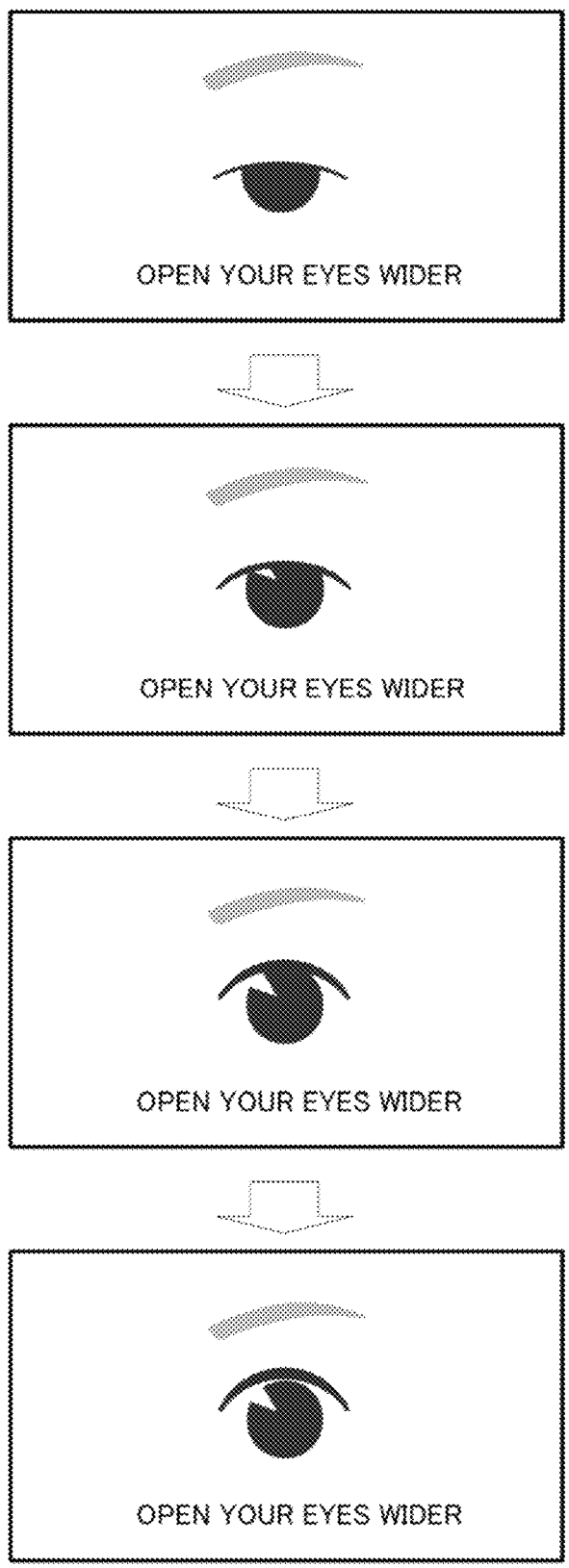
FIG. 29 is a conceptual diagram illustrating a display example for notifying the customer to open the eyes.

As illustrated in FIG. 28, when capturing the face image or iris image of the customer, a display may be made to request the customer to take off a wearing article. For example, as illustrated in FIG. 28A, a message and an image may be displayed to request the customer to take off glasses. As illustrated in FIG. 28B, a message and an image may be displayed to request the customer to take off sunglasses. As illustrated in FIG. 28C, a message and an image may be displayed to request the customer to take off a mask. Such a display may be made at all times when capturing the customer's image, or may be performed only when a relevant wearing article is detected from the customer's image. By requesting the customer to take off a wearing article, it is possible to obtain the image in which it is easy to carry out the face authentication and the iris authentication.

As illustrated in FIG. 29, when capturing the iris image of the customer by using the iris camera 210, a display may be made to encourage the customer to open the eyes. Specifically, such an animation that a closed eye opens slightly may be displayed. In this case, it is stopped for a while with a first picture in which the eye is half open, and then, it shifts to an animation in which the eye is opened gradually. In the open-eye animation, a speed of opening the eye is accelerated, and is stopped when the eye is maximally open. This allows the customer to be more effectively aware of opening the eyes. In addition to such animations, a message such as "Open your eyes wider" may be displayed. Such a display allows the customer to be aware of opening the eyes wide, and it is possible to capture an appropriate iris image. It is possible to change a speed of the animation in which the eye is gradually opened, in accordance with an opening degree of the eyes detected. For example, when it is determined by a method of determining the opening degree of the eyes that the opening degree of the eyes is small, opening the eyes wider is emphasized by increasing the speed of opening of the eye. The animation may also be repeatedly displayed. For example, it is possible to guide the customer to open the eyes wider by repeating the animation multiple times while obtaining and verifying the iris.

<Modified Example of Camera>

Figure 30:
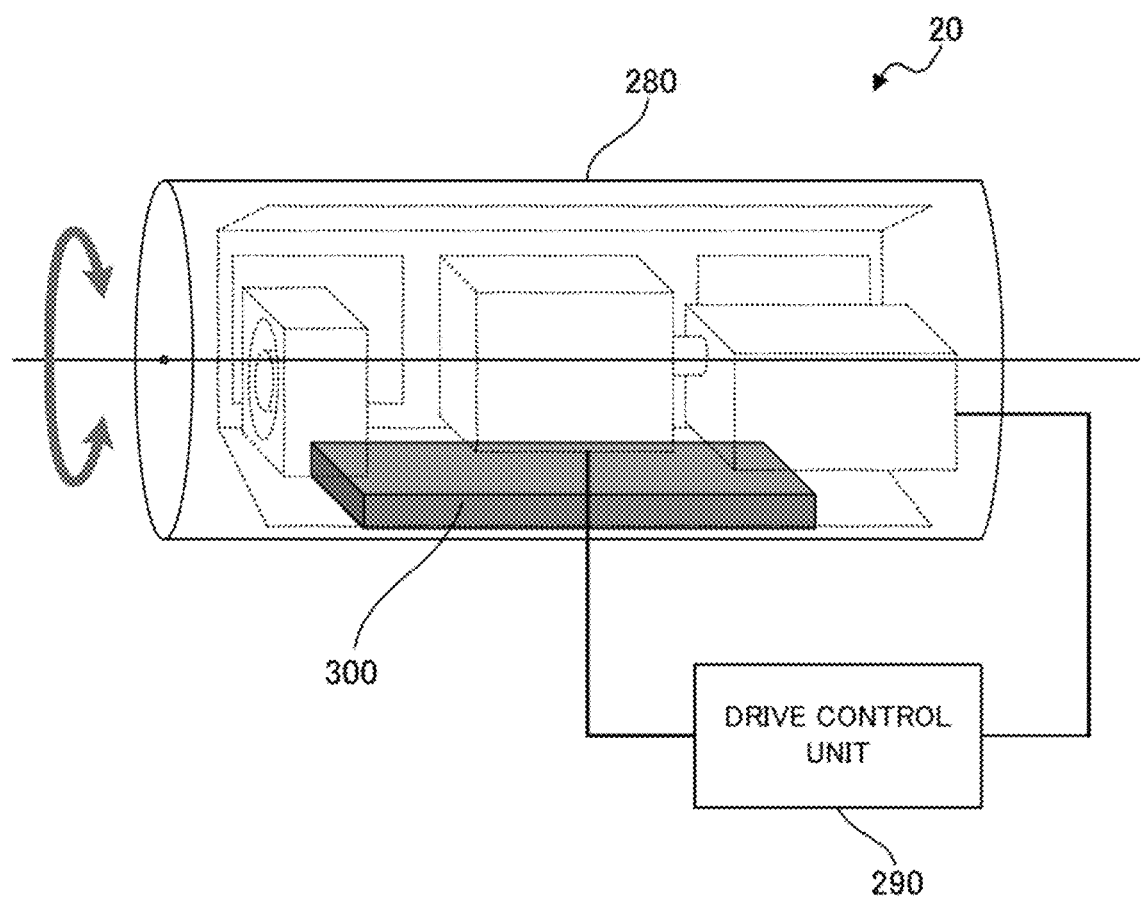
FIG. 30 is a schematic view illustrating a modified example of the camera.

A modified example of the camera 20 described in detail in the second example embodiment will be described with reference to FIG. 30. FIG. 30 is a schematic view illustrating the modified example of the camera. In FIG. 30, the same components as those illustrated in FIG. 9 carry the same reference numerals.

As illustrated in FIG. 30, the camera 20 may be configured with a scanner 300. The scanner 300 is a scanner that reads merchandise and is configured, for example, as a barcode scanner. In this case, for example, when an article of a merchandise is placed in a lower part of the camera 20, the scanner 300 performs the reading of the article of merchandise. At this time, the camera 20 may be driven by the drive control unit 290 (i.e., driving may be performed to change a scanning position by the scanner 300) such that that the scanner 300 can appropriately reading the merchandise. The scanner 300 may be a scanner that reads an electronic tag affixed or attached to an article of merchandise.

<Display Examples Related to Payment>

Figure 33:
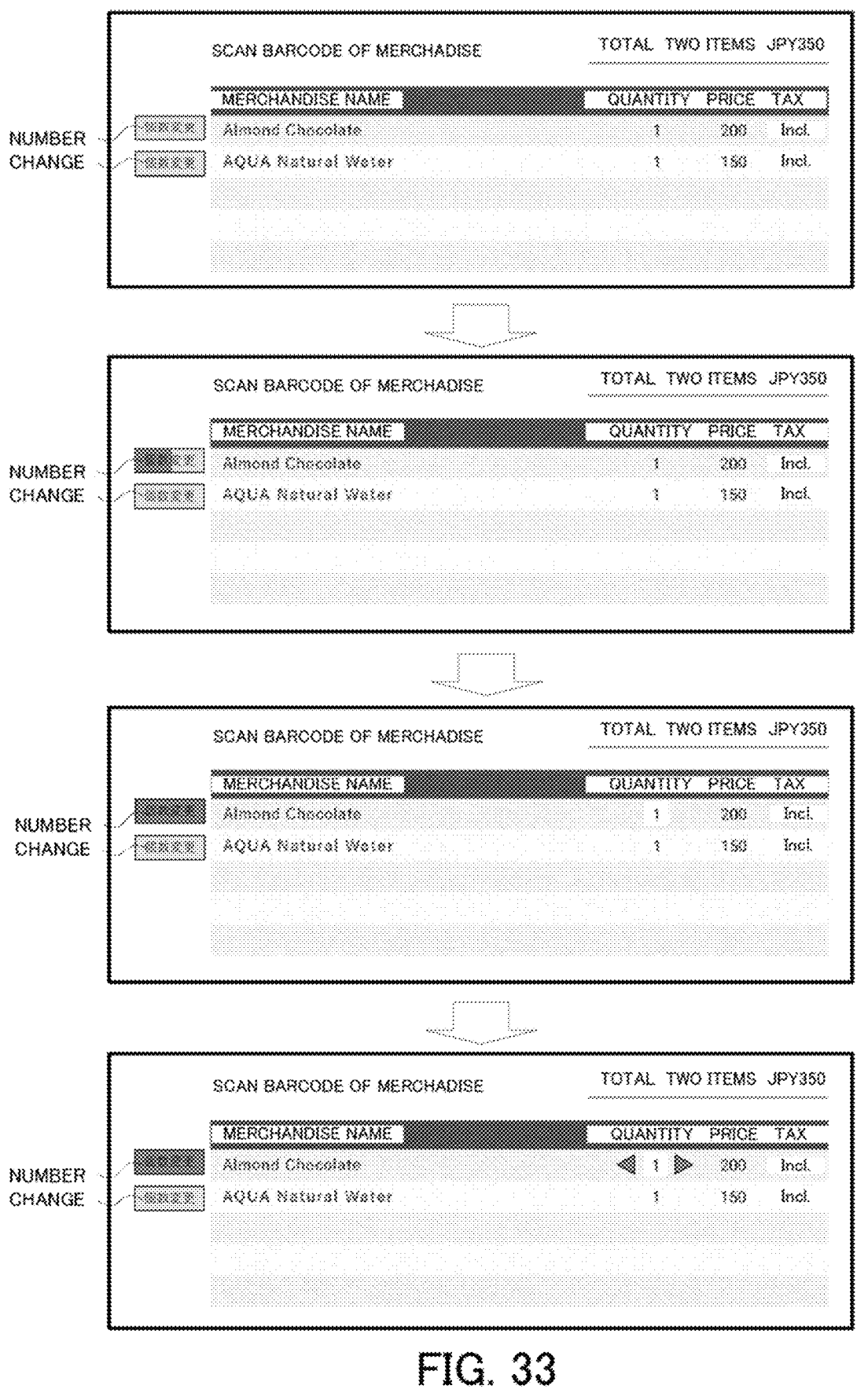

Display examples in the payment will be described with reference to FIG. 31 to FIG. 35. FIG. 31 is a conceptual diagram illustrating a display example of a cancel button. FIG. 32 is a conceptual diagram illustrating a display example after a cancel. FIG. 33 is a conceptual diagram illustrating a display example of a number change button. FIG. 34 is a conceptual diagram illustrating a display example of an amount change button. FIG. 35 is a conceptual diagram illustrating a display example when there is an article of merchandise that requires age confirmation.

As illustrated in FIG. 31, a "cancel" button (a button to cancel the purchase) may be displayed next to the merchandise information indicating the read merchandise. In this case, for example, when the customer gazes at the cancel button, as described in the seventh example embodiment (see FIG. 22), the color of the cancel button is gradually changed. Then, when the color of the cancel button is all changed, the purchase of the merchandise is canceled. The cancelled merchandise is deleted from the merchandise list.

As illustrated in FIG. 32A, the canceled merchandise may be grayed out without being deleted. In case of the gray out, a "repurchase (cancel-invalidate)" button may be displayed instead of the cancel button. The repurchase button allows invalidation of the cancel (allows a repurchasable state) by the customer gazing at the repurchase button as in the cancel button described above. Incidentally, as in the cancel button, a display may be made to gradually change the color in the repurchase button.

As illustrated in FIG. 32B, when the merchandise is canceled, in addition to a total amount after the cancel, a total amount before the cancel may be displayed. That is, the total amounts before and after the cancel may be displayed side by side to compare. Alternatively, in addition to the total amount after the cancel, a difference from the total amount before the cancel may be displayed.

As illustrated in FIG. 33, in the case of a system in which the merchandise can be received automatically after the payment, such as a vending machine (a payment terminal may be incorporated in the vending machine itself, or the payment terminal may be installed next to the vending machine), it may display a "number change" button on the side of the merchandise to be purchased. The number change button is a button that allows the customer to change the number of articles of merchandise by the customer gazing at the button. Specifically, when the customer gazes at the number change button, as in the cancel button described above, the color of the number change button is gradually changed. Then, when the color of the number change button is all changed, the display of the column of quantity is changed (e.g., the number is blinked the background color of the number is changed, it becomes a blank, etc.), to inform the customer that the quantity can be changed. In this condition, when the customer makes an action to change the quantity, the quantity of the merchandise is changed. For example, as in the example illustrated in FIG. 33, when displaying arrows on the left and right of the number, the quantity increases when gazing at the right arrow, the quantity decreases when gazing at the left arrow. Incidentally, this arrow may be displayed at the same time as the color of the cancel button ends to change, or of the arrow may start to be displayed after a lapse of a predetermined time (e.g., after 1 second) from when the column of the quantity can be changed after the color of the cancel button ends to change as illustrated in FIG. 33. Alternatively, when continuing to gaze at the column of the quantity, the quantity may be changed every second from one to two and to three. Alternatively, the quantity may be increased by one for each blink when blinking with the right eye, and may be reduced by one for each blink when blinking with the left eye. Alternatively, the quantity may be increased by one in each shake of the head to the right, and may be reduced by one in each shake of the head to the left. Furthermore, it is not necessary to display the left and right arrows in the column of the quantity when continuing to gaze at the column of the quantity described above, when blinking, and when shaking the head. In the action of blinking and shaking the head, the left and the right may be opposite to those in the above (the quantity may be reduced by one for each blink when blinking with the right eye, and may be increased by one for each blink when blinking with the left eye, or alternatively, the quantity may be reduced by one in each shake of the head to the right, and may be increased by one in each shake of the head to the left). Incidentally, during the quantity change, the number change button may change to a "confirm" button. In this case, when the customer gazes at the confirm button after changing the quantity, the changed quantity is confirmed and the total amount is changed (note that the total amount may be changed at each time the quantity is changed).

As illustrated in FIG. 34A, an "amount change" button may be displayed on a screen indicating the read merchandise information. The amount change button is a button to be used when there is a discrepancy in the read merchandise information (e.g., when there is a discrepancy between the displayed merchandise name and the read merchandise, and when there is a discrepancy between the displayed amount of money and the amount of money displayed on leaflets or a price tag in a store, etc.), and the change of the amount can be requested by the customer gazing at the button. When the customer requests a change in the amount of money, a process of calling a staff (a clerk, etc.) is performed. At this time, as illustrated in FIG. 34B, a message such as "Calling the staff. Please wait for a while" may be displayed.

As illustrated in FIG. 35A, when purchasing an article of merchandise that requires age confirmation and when reading the article of merchandise, a display may be made to indicate that age confirmation is necessary. Specifically, "no need/not yet confirmed/confirmed" in the age confirmation may be displayed on the payment screen. At this time, the customer may be notified to encourage an action of confirming the age. For example, as illustrated in the example of FIG. 35A, a display such as "There is an article of merchandise that requires age confirmation. Please hold an identification card over the camera" may be displayed.

As illustrated in FIG. 35B, when the age confirmation of the customer is completed, the displayed "not yet confirmed" is changed to "confirmed". At this time, a message such as "Age confirmation is successfully completed" may be displayed. Note that when there is an article of merchandise in which the age confirmation is "not yet confirmed", the payment process may not be allowed. For example, it is possible not to allow an input to the pay button (see FIG. 20 and FIG. 22, etc.) (not receive the input, hide the button, gray out, etc.).

The displays described in FIG. 31 to FIG. 35 are merely examples. Therefore, there is no particular limitation on the arrangement position, size, and the like of each button described above. Incidentally, the display of these buttons may be made not only by using one type of display, but also by combining a plurality of types of displays.

A processing method that records on a recording medium a program for operating the configuration of each of the example embodiments to realize the functions of the example embodiments described above, that reads the program recorded on the recording medium as a code, and that executes it on a computer, is also included in the scope of each of the example embodiments. That is, a computer-readable recording medium is also included in the scope of each of the example embodiments. In addition, not only the recording medium on which the above-described program is recorded, but also the program itself are included in each of the example embodiments.

For example, a floppy (registered trademark) disk, a hard disk, an optical disk, a magnetic-optical disk, a CD-ROM, a magnetic tape, a non-volatile memory card, or a ROM can be used as the recording medium. In addition, not only the program itself that is recorded on the recording medium and that is used to execute processing, but also the program that operates on an operating system and that executes processing in collaboration with other software and the function of an expansion board, are included in the scope of each of the example embodiments.

The disclosure is not limited to the examples described above and is allowed to be changed, if desired, without departing from the essence or spirit of the invention which can be read from the claims and the entire specification. A payment system, a payment method, and a computer program with such changes are also intended to be within the technical scope of the disclosure.

<Supplementary Notes>

The example embodiments described above may be further described as the following Supplementary Notes, but are not limited to the following.

(Supplementary Note 1)

A payment system described in Supplementary Note 1 is a payment system including: a merchandise reading unit that reads merchandise; a merchandise information acquisition unit that obtains a merchandise information about the read merchandise; a confirmation information output unit that outputs a confirmation information for confirming with a customer an intention of payment of the merchandise; a receiving unit that receives an input from the customer for the confirmation information; a face acquisition unit that obtains a face image of the customer; an iris acquisition unit that obtains an iris image of the customer; and a payment processing unit that performs a payment process for the merchandise on the basis of the input from the customer and on the basis of at least one of the face image and the iris image.

(Supplementary Note 2)

A payment system described in Supplementary Note 2 is the payment system described in Supplementary Note 1, wherein the face acquisition unit and the iris acquisition unit obtain the face image and the iris image from a face camera and an iris camera that are integrally driven.

(Supplementary Note 3)

A payment system described in Supplementary Note 3 is the payment system described in Supplementary Note 1 or 2, wherein the merchandise reading unit reads the merchandise by using a face camera from which the face acquisition unit obtains the face image, and the face camera is driven in at least one direction to change an imaging range when the merchandise is read.

(Supplementary Note 4)

A payment system described in Supplementary Note 4 is the payment system described in any one of Supplementary Notes 1 to 3, wherein the receiving unit receives the input from the customer on the basis of a gaze direction of the customer estimated from at least one of the face image and the iris image.

(Supplementary Note 5)

A payment system described in Supplementary Note 5 is the payment system described in Supplementary Note 4, wherein the confirmation information output unit displays at least one gaze area corresponding to the intention of payment, and the receiving unit receives information corresponding to the gaze area at which the customer gazes, as the input from the customer.

(Supplementary Note 6)

A payment system described in Supplementary Note 6 is the payment system described in Supplementary Note 5, wherein the confirmation information output unit displays a frame that gradually converges from an outside of the gaze area to the gaze area in accordance with a time length in which the customer gazes at the gaze area.

(Supplementary Note 7)

A payment system described in Supplementary Note 7 is the payment system described in Supplementary Note 5 or 6, wherein the confirmation information output unit gradually changes a color of the gaze area toward an outside of a screen in accordance with a time length in which the customer gazes at the gaze area.

(Supplementary Note 8)

A payment system described in Supplementary Note 8 is the payment system described in any one of Supplementary Notes 1 to 7, further comprising a biometric determination unit that determines biological likeness of the customer on the basis of a movement of a line of sight of the customer estimated from the iris image, wherein the paying processing unit determines whether or not to perform the payment process on the basis of the face image when the biological likeness is higher than a predetermined threshold, and determines whether or not to perform the payment process on the basis of the face image and the iris image when the biological likeness is lower than the predetermined threshold.

(Supplementary Note 9)

A payment method described in Supplementary Note 9 is a payment method including: reading merchandise; obtaining a merchandise information about the read merchandise; outputting a confirmation information for confirming with a customer an intention of payment of the merchandise; receiving an input from the customer for the confirmation information; obtaining a face image of the customer; obtaining an iris image of the customer; and performing a payment process for the merchandise on the basis of the input from the customer and on the basis of at least one of the face image and the iris image.

(Supplementary Note 10)

A computer program described in Supplementary Note 10 is a computer program that allows a computer to execute: reading merchandise; obtaining a merchandise information about the read merchandise; outputting a confirmation information for confirming with a customer an intention of payment of the merchandise; receiving an input from the customer for the confirmation information; obtaining a face image of the customer; obtaining an iris image of the customer; and performing a payment process for the merchandise on the basis of the input from the customer and on the basis of at least one of the face image and the iris image.

(Supplementary Note 11)

A recording medium described in Supplementary Note 11 is a recording medium on which a computer program described in Supplementary Note 10 is recorded.

DESCRIPTION OF REFERENCE CODES

10 Payment system
11 Processor
20 Camera
110 Merchandise reading unit
120 Merchandise information acquisition unit
130 Confirmation information output unit
131 Gaze area display unit
132 Frame display unit
133 Area color change unit
140 Input receiving unit
141 Gaze direction estimation unit
150 Face image acquisition unit
160 Iris image acquisition unit
170 Payment processing unit
180 Biometric determination unit
210 Iris camera
220 Face camera
225 Camera unit
230 Illumination unit
235 Visible light filter
250 Holding part
260 Air cooling fan
270 Motor
275 Fixed part
280 Housing
290 Drive control unit
300 Scanner

What is claimed is:

1. A payment system comprising:
a camera assembly including a face camera and an iris camera fixably disposed within the camera assembly such that an imaging region of the iris camera is a sub-region of the imaging region of the face camera;
a motor configured to rotate the face camera and the iris camera, the face camera and the iris camera further fixably disposed within the camera assembly such that the face camera and the iris camera rotate in unison;
at least one memory that is configured to store information and instructions; and
at least one processor that is configured to execute the instructions to:
instruct a customer to look in a particular direction when the customer wants to purchase merchandise;
capture a gaze direction image of the customer using the face camera;
determine a gaze direction of the customer based on the gaze direction image;
determine whether the customer wants to purchase the merchandise, by determining whether the gaze direction indicates that the customer is looking in the particular direction;
in response to determining that the customer wants to purchase the merchandise, capture a face image of the customer using the face camera;
detect an eye region of the face of the customer in the face image;
determine, based on the eye region detected in the face image, an amount by which to rotate the iris camera and the face camera so that the imaging region of the iris camera includes the eye region of the face of the customer;
rotate the iris camera and the face camera by the determined amount, using the motor;
capture an iris image of the customer using the iris camera, the iris image including the eye region of the face of the customer as a result of rotation of the iris camera and the face camera;
authenticate the customer using the iris image; and
in response to successful authentication, perform a payment process for the merchandise.

2. The payment system according to claim 1, wherein the instructions are executable by the at least one processor to read the merchandise by using the face camera, and
the face camera is driven in at least one direction to change an imaging range when the merchandise is read.

3. The payment system according to claim 1, wherein the instructions are executable by the at least one processor to:
display a gaze area corresponding to intention of purchase of the merchandise; and
receive information corresponding to the gaze area at which the customer gazes.

4. The payment system according to claim 3, wherein the instructions are executable by the at least one processor to display a frame that gradually converges from an outside of the gaze area to the gaze area in accordance with a time length in which the customer gazes at the gaze area.

5. The payment system according to claim 3, wherein the instructions are executable by the at least one processor to gradually change a color of the gaze area toward an outside of a screen in accordance with a time length in which the customer gazes at the gaze area.

6. A payment method performed by a processor of a payment system and comprising:
instructing a customer to look in a particular direction when the customer wants to purchase merchandise;
capturing a gaze direction image of the customer using a face camera of a camera assembly that also includes an iris camera fixably disposed within the camera assembly such that an imaging region of the iris camera is a sub-region of the imaging region of the face camera;
determining a gaze direction of the customer based on the gaze direction image;
determining whether the customer wants to purchase the merchandise, by determining whether the gaze direction indicates that the customer is looking in the particular direction;
in response to determining that the customer wants to purchase the merchandise, capture a face image of the customer using the face camera;
detecting an eye region of the face of the customer in the face image;
determining, based on the eye region detected in the face image, an amount by which to rotate the iris camera and the face camera so that the imaging region of the iris camera includes the eye region of the face of the customer;
rotating the iris camera and the face camera by the determined amount, using a motor configured to rotate the face camera and the iris camera, the face camera and the iris camera further fixably disposed within the camera assembly such that the face camera and the iris camera rotate in unison;
capturing an iris image of the customer using the iris camera, the iris image including the eye region of the face of the customer as a result of rotation of the iris camera and the face camera;
authenticating the customer using the iris image; and
in response to successful authentication, performing a payment process for the merchandise.

7. A non-transitory recording medium storing a computer program executable by a processor of a payment system to execute:
instructing a customer to look in a particular direction when the customer wants to purchase merchandise;
capturing a gaze direction image of the customer using a face camera of a camera assembly that also includes an iris camera fixably disposed within the camera assembly such that an imaging region of the iris camera is a sub-region of the imaging region of the face camera;
determining a gaze direction of the customer based on the gaze direction image;
determining whether the customer wants to purchase the merchandise, by determining whether the gaze direction indicates that the customer is looking in the particular direction;
in response to determining that the customer wants to purchase the merchandise, capture a face image of the customer using the face camera;
detecting an eye region of the face of the customer in the face image;
determining, based on the eye region detected in the face image, an amount by which to rotate the iris camera and the face camera so that the imaging region of the iris camera includes the eye region of the face of the customer;
rotating the iris camera and the face camera by the determined amount, using a motor configured to rotate the face camera and the iris camera, the face camera and the iris camera further fixably disposed within the camera assembly such that the face camera and the iris camera rotate in unison;
capturing an iris image of the customer using the iris camera, the iris image including the eye region of the face of the customer as a result of rotation of the iris camera and the face camera;
authenticating the customer using the iris image; and
in response to successful authentication, performing a payment process for the merchandise.

* * * * *